US009199861B2

United States Patent
Duesel, Jr. et al.

(10) Patent No.: US 9,199,861 B2
(45) Date of Patent: *Dec. 1, 2015

(54) WASTEWATER PROCESSING SYSTEMS FOR POWER PLANTS AND OTHER INDUSTRIAL SOURCES

(71) Applicant: HEARTLAND TECHNOLOGY PARTNERS LLC, St Louis, MO (US)

(72) Inventors: Bernard F. Duesel, Jr., Goshen, NY (US); Craig Clerkin, Stoughton, WI (US)

(73) Assignee: HEARTLAND TECHNOLOGY PARTNERS LLC, St Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/762,020

(22) Filed: Feb. 7, 2013

(65) Prior Publication Data

US 2014/0216033 A1    Aug. 7, 2014

(51) Int. Cl.
*C02F 1/16*    (2006.01)
*B01D 1/06*    (2006.01)
(Continued)

(52) U.S. Cl.
CPC . *C02F 1/048* (2013.01); *C02F 1/10* (2013.01); *C02F 9/00* (2013.01); *C02F 1/16* (2013.01); *C02F 1/38* (2013.01); *C02F 1/74* (2013.01); *C02F 2101/101* (2013.01); *C02F 2103/023* (2013.01); *C02F 2201/008* (2013.01); *Y02B 60/1228* (2013.01)

(58) Field of Classification Search
CPC .............. C02F 1/048; C02F 1/10; C02F 1/16; B01D 1/0058
USPC ........ 159/4.01, 4.02, 16.1, 16.2, 29, DIG. 12, 159/DIG. 39, 17.3, 31, 47.3; 60/670, 60/689–693; 261/120, 121.3, 123; 210/167.32, 220
See application file for complete search history.

(56) References Cited

U.S. PATENT DOCUMENTS 2,372,846 A    4/1945    Frederick et al.
2,387,818 A    10/1945    Wethly
(Continued)

FOREIGN PATENT DOCUMENTS

CL    757-2004    5/2007
CN    1262236 A    8/2000
(Continued)

OTHER PUBLICATIONS

"Gas Atomized Venturi Scrubbers," Bionomic Industries, copyright 2008, printed from www.bionomicind.com <http://www.bionomicind.com> on May 25, 2011.
(Continued)

*Primary Examiner* — Jesse Bogue
*Assistant Examiner* — Laert Dounis
(74) *Attorney, Agent, or Firm* — Marshall, Gerstein & Borun LLP

(57) ABSTRACT

Methods, systems, and/or apparatuses for treating wastewater produced at a thermoelectric power plant, other industrial plants, and/or other industrial sources are disclosed. The wastewater is directed through a wastewater concentrator including a direct contact adiabatic concentration system. A stream of hot feed gases is directed through the wastewater concentrator. The wastewater concentrator mixes the hot feed gases directly with the wastewater and evaporates water vapor from the wastewater. The wastewater concentrator separates the water vapor from remaining concentrated wastewater. A contained air-water interface liquid evaporator may be arranged to pre-process the wastewater before being treated by the wastewater concentrator.

19 Claims, 7 Drawing Sheets

(51) Int. Cl.
  *C02F 1/04* (2006.01)
  *C02F 1/10* (2006.01)
  *C02F 9/00* (2006.01)
  *C02F 1/38* (2006.01)
  *C02F 1/74* (2006.01)
  *C02F 101/10* (2006.01)
  *C02F 103/02* (2006.01)

(56) References Cited

U.S. PATENT DOCUMENTS

| | | | |
|---|---|---|---|
| 2,468,455 | A | 4/1949 | Metziger |
| 2,560,226 | A | 7/1951 | Joos et al. |
| 2,619,421 | A | 11/1952 | Greenfield |
| 2,638,444 | A * | 5/1953 | Kappe ............... 210/194 |
| 2,651,647 | A | 9/1953 | Greenfield |
| 2,658,349 | A | 11/1953 | Keller |
| 2,658,735 | A | 11/1953 | Ybarrondo |
| 2,721,065 | A | 10/1955 | Ingram |
| 2,790,506 | A | 4/1957 | Vactor |
| 2,867,972 | A | 1/1959 | Hokderreed et al. |
| 2,879,838 | A | 3/1959 | Flynt et al. |
| 2,890,166 | A | 6/1959 | Heinze |
| 2,911,421 | A | 11/1959 | Greenfield |
| 2,911,423 | A | 11/1959 | Greenfield |
| 2,979,408 | A | 4/1961 | Greenfield |
| 2,981,250 | A | 4/1961 | Steward |
| 3,060,921 | A | 10/1962 | Luring et al. |
| 3,076,715 | A | 2/1963 | Greenfield |
| 3,203,875 | A | 8/1965 | Sturtevant |
| 3,211,538 | A | 10/1965 | Gross et al. |
| 3,212,235 | A | 10/1965 | Markant |
| 3,251,398 | A | 5/1966 | Greenfield |
| 3,268,443 | A | 8/1966 | Cann |
| 3,284,064 | A | 11/1966 | Kolm et al. |
| 3,299,651 | A | 1/1967 | McGrath |
| 3,304,991 | A | 2/1967 | Greenfield |
| 3,306,039 | A | 2/1967 | Peterson |
| 3,323,575 | A | 6/1967 | Greenfield |
| 3,405,918 | A | 10/1968 | Calaceto et al. |
| 3,432,399 | A | 3/1969 | Schutt |
| 3,539,549 | A | 11/1970 | Greenfield |
| 3,578,892 | A | 5/1971 | Wilkinson |
| 3,601,374 | A | 8/1971 | Wheeler |
| 3,638,924 | A | 2/1972 | Calaceto et al. |
| 3,704,570 | A | 12/1972 | Gardenier |
| 3,713,786 | A | 1/1973 | Umstead |
| 3,716,458 | A | 2/1973 | Greenfield et al. |
| 3,730,673 | A | 5/1973 | Straitz, III |
| 3,743,483 | A | 7/1973 | Shah |
| 3,754,869 | A | 8/1973 | Van Raden |
| 3,756,580 | A | 9/1973 | Dunn |
| 3,756,893 | A | 9/1973 | Smith |
| 3,762,893 | A | 10/1973 | Larsen |
| 3,782,300 | A * | 1/1974 | White et al. ............... 110/238 |
| 3,789,902 | A | 2/1974 | Shah et al. |
| 3,826,096 | A | 7/1974 | Hrusch |
| 3,838,974 | A | 10/1974 | Hemsath et al. |
| 3,838,975 | A | 10/1974 | Tabak |
| 3,840,002 | A | 10/1974 | Douglas et al. |
| 3,855,079 | A | 12/1974 | Greenfield et al. |
| 3,870,585 | A | 3/1975 | Kearns et al. |
| 3,876,490 | A | 4/1975 | Tsuruta |
| 3,880,756 | A | 4/1975 | Raineri et al. |
| 3,898,134 | A | 8/1975 | Greenfield et al. |
| 3,901,643 | A | 8/1975 | Reed |
| 3,915,620 | A | 10/1975 | Reed |
| 3,917,508 | A | 11/1975 | Greenfield et al. |
| 3,925,148 | A | 12/1975 | Erwin |
| 3,944,215 | A | 3/1976 | Beck |
| 3,945,331 | A | 3/1976 | Drake et al. |
| 3,947,215 | A | 3/1976 | Peterson et al. |
| 3,947,327 | A | 3/1976 | Greenfield et al. |
| 3,950,230 | A | 4/1976 | Greenfield et al. |
| 3,994,671 | A | 11/1976 | Straitz, III |
| 4,001,077 | A | 1/1977 | Kemper |
| 4,007,094 | A | 2/1977 | Greenfield et al. |
| 4,012,191 | A | 3/1977 | Lisankie et al. |
| 4,013,516 | A | 3/1977 | Greenfield et al. |
| 4,026,682 | A | 5/1977 | Pausch |
| 4,036,576 | A | 7/1977 | McCracken |
| 4,070,423 | A | 1/1978 | Pierce |
| 4,079,585 | A | 3/1978 | Helleur |
| 4,080,883 | A | 3/1978 | Zink et al. |
| 4,092,908 | A | 6/1978 | Straitz, III |
| 4,118,173 | A | 10/1978 | Shakiba |
| 4,119,538 | A | 10/1978 | Yamauchi et al. |
| 4,140,471 | A | 2/1979 | Straitz, III |
| 4,154,570 | A | 5/1979 | Schwartz |
| 4,157,239 | A | 6/1979 | Reed |
| 4,181,173 | A | 1/1980 | Pringle |
| 4,185,685 | A | 1/1980 | Giberson |
| 4,198,198 | A | 4/1980 | Straitz, III |
| 4,227,897 | A | 10/1980 | Reed |
| 4,230,536 | A | 10/1980 | Sech |
| 4,257,746 | A | 3/1981 | Wells |
| 4,259,185 | A | 3/1981 | Mixon |
| 4,264,826 | A | 4/1981 | Ullmann |
| 4,270,974 | A | 6/1981 | Greenfield et al. |
| 4,276,115 | A | 6/1981 | Greenfield et al. |
| 4,285,578 | A | 8/1981 | Yamashita et al. |
| 4,300,924 | A | 11/1981 | Coyle |
| 4,306,858 | A | 12/1981 | Simon |
| 4,336,101 | A | 6/1982 | Greenfield et al. |
| 4,346,660 | A | 8/1982 | McGill |
| 4,347,704 | A * | 9/1982 | Marquardt et al. ............... 60/648 |
| RE31,185 | E | 3/1983 | Greenfield et al. |
| 4,430,046 | A | 2/1984 | Cirrito |
| 4,432,914 | A | 2/1984 | Schiffner |
| 4,440,098 | A | 4/1984 | Adams |
| 4,445,464 | A | 5/1984 | Gerstmann et al. |
| 4,445,842 | A | 5/1984 | Syska |
| 4,450,901 | A | 5/1984 | Janssen |
| 4,474,477 | A | 10/1984 | Smith et al. |
| 4,485,746 | A | 12/1984 | Erlandsson |
| 4,496,314 | A | 1/1985 | Clarke |
| 4,518,458 | A | 5/1985 | Greenfield et al. |
| 4,538,982 | A | 9/1985 | McGill et al. |
| 4,583,936 | A | 4/1986 | Krieger |
| 4,608,120 | A | 8/1986 | Greenfield et al. |
| 4,613,409 | A | 9/1986 | Volland |
| 4,642,919 | A | 2/1987 | Werner et al. |
| 4,648,973 | A | 3/1987 | Hultholm et al. |
| 4,652,233 | A | 3/1987 | Hamazaki et al. |
| 4,658,736 | A | 4/1987 | Walter |
| 4,677,307 | A * | 6/1987 | Vadas et al. ............... 290/2 |
| 4,683,062 | A | 7/1987 | Krovak et al. |
| 4,689,156 | A | 8/1987 | Zibrida |
| 4,693,304 | A | 9/1987 | Volland |
| 4,761,077 | A | 8/1988 | Werner |
| 4,771,708 | A | 9/1988 | Douglass, Jr. |
| 4,818,392 | A | 4/1989 | Werner et al. |
| 4,838,184 | A | 6/1989 | Young et al. |
| 4,863,644 | A | 9/1989 | Harrington et al. |
| 4,877,532 | A | 10/1989 | Haentjens et al. |
| 4,882,009 | A | 11/1989 | Santoleri et al. |
| 4,890,672 | A | 1/1990 | Hall |
| 4,909,730 | A | 3/1990 | Roussakis et al. |
| 4,913,065 | A | 4/1990 | Hemsath |
| 4,917,577 | A | 4/1990 | Stirling |
| 4,938,899 | A | 7/1990 | Oros et al. |
| 4,952,137 | A | 8/1990 | Schwartz et al. |
| 4,954,147 | A | 9/1990 | Galgon |
| 4,961,703 | A | 10/1990 | Morgan |
| 5,004,484 | A | 4/1991 | Stirling et al. |
| 5,009,511 | A | 4/1991 | Sarko et al. |
| 5,028,298 | A | 7/1991 | Baba et al. |
| 5,030,428 | A | 7/1991 | Dorr et al. |
| 5,032,230 | A | 7/1991 | Shepherd |
| 5,043,104 | A | 8/1991 | Stirling |
| 5,045,202 | A | 9/1991 | Stearns et al. |
| 5,068,092 | A | 11/1991 | Aschauer |
| 5,076,895 | A | 12/1991 | Greenfield et al. |
| 5,085,809 | A | 2/1992 | Stirling |

(56) References Cited

U.S. PATENT DOCUMENTS

| | | |
|---|---|---|
| 5,092,909 A | 3/1992 | Werner et al. |
| 5,131,757 A | 7/1992 | Smith |
| 5,132,090 A | 7/1992 | Volland |
| 5,154,898 A | 10/1992 | Ajinkya et al. |
| 5,176,798 A | 1/1993 | Rodden |
| 5,183,563 A | 2/1993 | Rodden |
| 5,227,017 A | 7/1993 | Tanaka et al. |
| 5,230,167 A | 7/1993 | Lahoda et al. |
| 5,238,580 A | 8/1993 | Singhvi |
| 5,279,356 A | 1/1994 | Bruhn |
| 5,279,646 A | 1/1994 | Schwab |
| 5,314,622 A | 5/1994 | Stirling |
| 5,336,284 A | 8/1994 | Schifftner |
| 5,342,482 A | 8/1994 | Duesel, Jr. |
| D350,838 S | 9/1994 | Johnson |
| 5,347,958 A | 9/1994 | Gordon, Jr. |
| 5,423,979 A | 6/1995 | Allen |
| 5,454,939 A * | 10/1995 | Meuche ............... 210/134 |
| 5,460,511 A | 10/1995 | Grahn |
| 5,484,471 A | 1/1996 | Schwab |
| 5,512,085 A | 4/1996 | Schwab |
| 5,527,984 A | 6/1996 | Stultz et al. |
| 5,585,005 A | 12/1996 | Smith et al. |
| 5,630,913 A | 5/1997 | Tajer-Ardebili |
| 5,632,864 A | 5/1997 | Enneper |
| 5,636,623 A | 6/1997 | Panz et al. |
| 5,648,048 A | 7/1997 | Kuroda et al. |
| 5,656,155 A | 8/1997 | Norcross et al. |
| 5,662,802 A | 9/1997 | Heins et al. |
| 5,695,614 A | 12/1997 | Hording et al. |
| 5,695,643 A | 12/1997 | Brandt et al. |
| 5,735,680 A | 4/1998 | Henkelmann |
| 5,749,719 A | 5/1998 | Rajewski |
| 5,759,233 A | 6/1998 | Schwab |
| 5,810,578 A | 9/1998 | Hystad |
| 5,865,618 A | 2/1999 | Hiebert |
| 5,879,563 A | 3/1999 | Garbutt |
| 5,925,223 A | 7/1999 | Simpson et al. |
| 5,934,207 A | 8/1999 | Echols et al. |
| 5,951,743 A | 9/1999 | Hsieh et al. |
| 5,958,110 A | 9/1999 | Harris et al. |
| 5,968,320 A | 10/1999 | Sprague |
| 5,968,352 A | 10/1999 | Ditzler |
| 6,007,055 A | 12/1999 | Schifftner |
| 6,119,458 A | 9/2000 | Harris et al. |
| 6,149,137 A | 11/2000 | Johnson et al. |
| 6,250,916 B1 | 6/2001 | Philippe et al. |
| 6,276,872 B1 | 8/2001 | Schmitt |
| 6,293,277 B1 * | 9/2001 | Panz et al. .............. 126/360.2 |
| 6,332,949 B1 | 12/2001 | Beckhaus et al. |
| 6,345,495 B1 | 2/2002 | Cummings |
| 6,383,260 B1 | 5/2002 | Schwab |
| 6,391,100 B1 | 5/2002 | Hogan |
| 6,391,149 B1 | 5/2002 | Calfee et al. |
| 6,402,816 B1 | 6/2002 | Trivett et al. |
| 6,435,860 B1 | 8/2002 | Brookshire et al. |
| 6,468,389 B1 | 10/2002 | Harris et al. |
| 6,485,548 B1 | 11/2002 | Hogan |
| 6,488,740 B1 * | 12/2002 | Patel et al. ................. 95/71 |
| 6,500,216 B1 | 12/2002 | Takayasu |
| 6,616,733 B1 | 9/2003 | Pellegrin |
| 6,632,083 B1 | 10/2003 | Bussman et al. |
| 6,719,829 B1 | 4/2004 | Schwab |
| 6,733,636 B1 | 5/2004 | Heins |
| 6,742,337 B1 | 6/2004 | Hays et al. |
| 6,752,920 B2 | 6/2004 | Harris et al. |
| 6,913,671 B2 | 7/2005 | Bolton et al. |
| 6,919,000 B2 | 7/2005 | Klausner et al. |
| 6,926,757 B2 | 8/2005 | Kalliokoski et al. |
| 6,936,140 B2 | 8/2005 | Paxton et al. |
| 7,037,434 B2 | 5/2006 | Myers et al. |
| 7,069,991 B2 | 7/2006 | Gudmestad et al. |
| 7,073,337 B2 | 7/2006 | Mangin |
| 7,074,339 B1 | 7/2006 | Mims |
| 7,077,201 B2 | 7/2006 | Heins |
| 7,111,673 B2 | 9/2006 | Hugill |
| 7,142,298 B2 | 11/2006 | Nuspliger |
| 7,144,555 B1 | 12/2006 | Squires et al. |
| 7,150,320 B2 | 12/2006 | Heins |
| 7,156,985 B1 | 1/2007 | Frisch |
| 7,166,188 B2 | 1/2007 | Kedem et al. |
| 7,214,290 B2 | 5/2007 | Duesel, Jr. et al. |
| 7,225,620 B2 | 6/2007 | Klausner et al. |
| 7,288,186 B2 | 10/2007 | Harris |
| 7,332,010 B2 | 2/2008 | Steiner |
| 7,402,247 B2 | 7/2008 | Sutton |
| 7,416,172 B2 | 8/2008 | Duesel, Jr. et al. |
| 7,416,177 B2 | 8/2008 | Suzuki et al. |
| 7,424,999 B2 | 9/2008 | Xu et al. |
| 7,428,926 B2 | 9/2008 | Heins |
| 7,438,129 B2 | 10/2008 | Heins |
| 7,442,035 B2 | 10/2008 | Duesel, Jr. et al. |
| 7,459,135 B2 | 12/2008 | Pieterse et al. |
| 7,572,626 B2 | 8/2009 | Frisch et al. |
| 7,591,309 B2 | 9/2009 | Minnich et al. |
| 7,614,367 B1 | 11/2009 | Frick |
| 7,661,662 B2 | 2/2010 | Forstmanis |
| 7,681,643 B2 | 3/2010 | Heins |
| 7,717,174 B2 | 5/2010 | Heins |
| 7,758,819 B2 | 7/2010 | Nagelhout |
| 7,832,714 B2 | 11/2010 | Duesel, Jr. et al. |
| 7,955,419 B2 | 6/2011 | Casella |
| 8,066,844 B2 | 11/2011 | Duesel, Jr. et al. |
| 8,066,845 B2 * | 11/2011 | Duesel et al. ............... 159/16.2 |
| 8,114,287 B2 | 2/2012 | Harris |
| 8,136,797 B2 | 3/2012 | Duesel, Jr. et al. |
| 8,518,257 B2 | 8/2013 | Galgon et al. |
| 8,557,117 B2 | 10/2013 | Galgon et al. |
| 8,585,869 B1 * | 11/2013 | Duesel et al. ............... 203/12 |
| 8,679,291 B2 | 3/2014 | Duesel, Jr. et al. |
| 8,821,728 B2 | 9/2014 | Galgon et al. |
| 2001/0013666 A1 | 8/2001 | Nomura et al. |
| 2002/0069838 A1 | 6/2002 | Rautenbach et al. |
| 2003/0104778 A1 | 6/2003 | Liu |
| 2003/0127226 A1 | 7/2003 | Heins |
| 2004/0000515 A1 | 1/2004 | Harris et al. |
| 2004/0031424 A1 | 2/2004 | Pope |
| 2004/0040671 A1 | 3/2004 | Duesel et al. |
| 2004/0045681 A1 * | 3/2004 | Bolton et al. ............... 159/16.2 |
| 2004/0045682 A1 | 3/2004 | Liprie |
| 2004/0079491 A1 | 4/2004 | Harris et al. |
| 2005/0022989 A1 | 2/2005 | Heins |
| 2005/0074712 A1 | 4/2005 | Brookshire et al. |
| 2005/0230238 A1 | 10/2005 | Klausner et al. |
| 2005/0242036 A1 | 11/2005 | Harris |
| 2005/0279500 A1 | 12/2005 | Heins |
| 2006/0000355 A1 | 1/2006 | Ogura et al. |
| 2006/0032630 A1 | 2/2006 | Heins |
| 2007/0051513 A1 | 3/2007 | Heins |
| 2007/0084808 A1 | 4/2007 | Williamson et al. |
| 2007/0114683 A1 | 5/2007 | Duesel et al. |
| 2007/0175189 A1 | 8/2007 | Gomiciaga-Pereda et al. |
| 2007/0251650 A1 | 11/2007 | Duesel et al. |
| 2008/0110417 A1 | 5/2008 | Smith |
| 2008/0115361 A1 | 5/2008 | Santini et al. |
| 2008/0173176 A1 | 7/2008 | Duesel et al. |
| 2008/0173590 A1 | 7/2008 | Duesel et al. |
| 2008/0174033 A1 | 7/2008 | Duesel et al. |
| 2008/0213137 A1 | 9/2008 | Frisch et al. |
| 2008/0265446 A1 | 10/2008 | Duesel et al. |
| 2008/0272506 A1 | 11/2008 | Duesel et al. |
| 2008/0277262 A1 | 11/2008 | Harris |
| 2009/0020481 A1 | 1/2009 | Bailie et al. |
| 2009/0078416 A1 | 3/2009 | Heins |
| 2009/0127091 A1 | 5/2009 | Heins |
| 2009/0294074 A1 | 12/2009 | Forstmanis |
| 2010/0095763 A1 | 4/2010 | Harris |
| 2010/0126931 A1 | 5/2010 | Capeau et al. |
| 2010/0139871 A1 | 6/2010 | Rasmussen et al. |
| 2010/0176042 A1 | 7/2010 | Duesel, Jr. et al. |
| 2010/0224364 A1 | 9/2010 | Heins |
| 2010/0236724 A1 | 9/2010 | Duesel, Jr. et al. |
| 2011/0005999 A1 | 1/2011 | Randal |
| 2011/0061816 A1 | 3/2011 | Duesel, Jr. et al. |

(56) References Cited

U.S. PATENT DOCUMENTS

| | | | |
|---|---|---|---|
| 2011/0083556 | A1 | 4/2011 | Duesel, Jr. et al. |
| 2011/0100924 | A1 | 5/2011 | Duesel, Jr. et al. |
| 2011/0108471 | A1 | 5/2011 | Page et al. |
| 2011/0132815 | A1 | 6/2011 | Angelilli et al. |
| 2011/0147195 | A1 | 6/2011 | Shapiro et al. |
| 2011/0168646 | A1 | 7/2011 | Tafoya |
| 2011/0174447 | A1 | 7/2011 | Duesel, Jr. et al. |
| 2011/0180470 | A1 | 7/2011 | Harris |
| 2011/0240540 | A1 | 10/2011 | Harris |
| 2012/0012309 | A1 | 1/2012 | Noles, Jr. |
| 2012/0186451 | A1 | 7/2012 | Duesel, Jr. et al. |
| 2012/0205303 | A1 | 8/2012 | Rosine et al. |
| 2012/0211441 | A1 | 8/2012 | Harris |
| 2012/0273367 | A1 | 11/2012 | Themy et al. |
| 2012/0292176 | A1 | 11/2012 | Machhammmer et al. |
| 2014/0083938 | A1 | 3/2014 | Galgon et al. |

FOREIGN PATENT DOCUMENTS

| | | |
|---|---|---|
| CN | 101445290 A | 6/2009 |
| DE | 556 455 C | 8/1932 |
| DE | 1 173 429 B | 7/1964 |
| EP | 0 047 044 A1 | 3/1982 |
| EP | 1 482 243 A1 | 12/2004 |
| FR | 2 441 817 A1 | 6/1980 |
| GB | 383570 A | 11/1932 |
| GB | 463770 A | 4/1937 |
| JP | 60257801 | 12/1985 |
| JP | 62121687 | 6/1987 |
| JP | 2003/021471 A | 1/2003 |
| JP | 2004-097866 A | 4/2004 |
| JP | 2007-117874 A | 5/2007 |
| WO | WO-96/10544 A2 | 4/1996 |
| WO | WO-2004/022487 A2 | 3/2004 |
| WO | WO-2005/110608 A1 | 11/2005 |
| WO | WO-2008/112793 A1 | 9/2008 |
| WO | WO-2009/071763 A1 | 6/2009 |
| WO | WO-2010/092265 A1 | 8/2010 |
| WO | WO-2011/042693 A2 | 4/2011 |
| WO | WO-2011/050317 A2 | 4/2011 |
| WO | WO 2012/100074 | 7/2012 |

OTHER PUBLICATIONS

"Waste Heat Recovery Systems," Bionomic Industries, copyright 2008, printed from www.bionomicind.com <http://www.bionomicind.com> on May 25, 2011.
Alabovskij et al., "Evaporation Des Eaux De Lavage De Chaudieres Dans Des Appareils A Combustion Immergee," *Promyshl. Energet*, 4:38-39 (1975).
Bachand et al., "Denitrification in Constructed Free-Water Surface Wetlands: II. Effects of Vegetation and Temperature," *Ecological Engineering*, 14:17-32 (2000).
Barrett et al., "The Industrial Potential and Economic Viability of Spouted Bed Processes," Chemeca 85, paper D4c, The Thirteenth Australasian Conference on Chemical Engineering, Perth, Australia, pp. 401-405 (1985).
Bennett et al., "Design of a Software Application for the Simulation and Control of Continuous and Batch Crystallizer Circuits," *Advances in Engineering Software*, 33:365-374 (2002).
Berg, "The Development of the Controlled Buoyancy System for Installation of Submerged Pipelines," *Journal AWWA, Water Technology/Quality*, pp. 214-218 (1977).
Brandt et al., "Treatment Process for Waste Water Disposal of the "Morcinek" Mine Using Coalbed Methane," Conference on Coalbed Methane Utilization, Oct. 5-7 (1994).
Cherednichenko et al., "Disposal of Saline Wastes From Petroleum Refineries, All-Union Scientific-Research and Planning-Design Institute of the Petroleum Refining and Petrochemical Industry," *Khimiya I Tekhnologiya Topliv I Masel*, 9:37-39 (1974). Translated.
Claflin et al., "The Use of Spouted Beds for the Heat Treatment of Grains," Chemeca 81, The 9th Australasian Conference on Chemical Engineering, Christchurch, New Zealand, 4:65-72 (1981).

Claflin, "Intraparticle Conduction Effects on the Temperature Profiles in Spouted Beds," Chemeca 85, paper D9b, The Thirteenth Australasian Conference on Chemical Engineering, Perth, Australia, pp. 471-475 (1985).
Cross et al., "Leachate Evaporation by Using Landfill Gas," Proceedings Sardinia 97, Sixth Landfill Symposium, S. Margherita di Pula, Cagliari, Italy, pp. 413-422 (1997).
Dunn, "Incineration's Role in Ultimate Disposal of Process Wastes," *Chemical Engineering, Deskbook Issue*, pp. 141-150 (1975).
Durkee et al., "Field Tests of Salt Recovery System for Spent Pickle Brine," *Journal of Food Service*, 38:507-511 (1973).
English language translation of an office action from Chilean Patent Application No. 237-2007.
English translation of Chinese First Office Action for Application No. 201080012067.7, dated Oct. 12, 2012.
English translation of Chinese Search Report for Application No. 201080012067.7, dated Sep. 12, 2012.
English-language translation of Hage, H., "The MeMon Experiment: A Step towards Large-Scale Processing of Manure," Applied Science, 4 (1988).
Etzensperger et al., "Phenol Degradation in a Three-Phase Biofilm Fluidized Sand Bed Reactor," *Bioprocess Engineering*, 4:175-181 (1989).
Fan et al., "Some Remarks on Hydrodynamic Behavior of a Draft Tube Gas-Liquid-Solid Fluidized Bed," AIChE Symposium Series, No. 234(80):91-97 (1985).
Final Office Action for U.S. Appl. No. 11/625,002, dated May 26, 2010.
Final Office Action for U.S. Appl. No. 11/625,022, dated Jan. 24, 2011.
Final Office Action for U.S. Appl. No. 11/625,024, dated Dec. 8, 2010.
Fox et al., "Control Mechanisms of Flulidized Solids Circulation Between Adjacent Vessels," *AIChE Journal*, 35(12):1933-1941 (1989).
Genck, "Guidelines for Crystallizer Selection and Operation," CEP, pp. 26-32 (2004). www.cepmagazine.org.
German Kurz, Tauchbrenner, OI U. Gasfeuerung, 18(3):171-180 (1973).
Hattori et al., "Fluid and Solids Flow Affecting the Solids Circulation Rate in Spouted Beds with a Draft Tube," *Journal of Chemical Engineering of Japan*, 37(9):1085-1091 (2004).
Hocevar et al., "The Influence of Draft-Tube Pressure Pulsations on the Cavitation-Vortex Dynamics in a Francis Turbine," *Journal of Mechanical Engineering*, 49:484-498 (2003).
International Preliminary Report on Patentability and Written Opinion issued for International Patent application No. PCT/US2011/021811, dated Aug. 14, 2012.
International Preliminary Report on Patentability for Application No. PCT/US2006/015803, dated Nov. 13, 2007.
International Preliminary Report on Patentability for Application No. PCT/US2006/028515, dated Jan. 22, 2008.
International Preliminary Report on Patentability for Application No. PCT/US2007/001487, dated Jul. 21, 2009.
International Preliminary Report on Patentability for Application No. PCT/US2007/001632, dated Jul. 21, 2009.
International Preliminary Report on Patentability for Application No. PCT/US2007/001633, dated Jul. 21, 2009.
International Preliminary Report on Patentability for Application No. PCT/US2007/001634, dated Jul. 21, 2009.
International Preliminary Report on Patentability for Application No. PCT/US2008/056702, dated Sep. 15, 2009.
International Preliminary Report on Patentability for Application No. PCT/US2010/043647, dated Feb. 9, 2012.
International Preliminary Report on Patentability for Application No. PCT/US2010/043648, dated Feb. 9, 2012.
International Search Report and Written Opinion for Application No. PCT/US08/56702, dated Jun. 10, 2008.
International Search Report and Written Opinion for Application No. PCT/US10/043647, dated Apr. 27, 2011.
International Search Report and Written Opinion for Application No. PCT/US10/043648, dated Apr. 27, 2011.

(56) References Cited

OTHER PUBLICATIONS

International Search Report and Written Opinion for Application No. PCT/US2006/015803, dated Oct. 30, 2007.
International Search Report and Written Opinion for Application No. PCT/US2010/024143, dated Oct. 12, 2010.
International Search Report and Written Opinion for Application PCT/US2011/021811, dated Mar. 21, 2011.
International Search Report for Application No. PCT/US2006/028515, dated Nov. 14, 2006.
International Search Report for Application No. PCT/US2012/021897, dated Oct. 8, 2012.
Jones, "Liquid Circulation in a Draft-Tube Bubble Column," *Chemical Engineering Science*, 40(3):449-462 (1985).
MikroPul, "Wet Scrubbers," (2009). www.mikropul.com.
Miyake et al., "Performance Characteristics of High Speed-Type Cross Flow Turbine," 83-0047:2575-2583 (1993).
Mueller et al., "Rotating Disk Looks Promising for Plant Wastes," (2007).
Mussatti, Daniel, Section 6, Particulate Matter Controls. Chapter 2 Wet Scrubbers for Particulate Matter. Innovative Strategies and Economics Group. Unisted States Environmental Protection Agency. Jul. 2002.
Notice of Allowance for U.S. Appl. No. 11/625,159, dated Jul. 9, 2010.
Office Action for U.S. Appl. No. 11/625,002, dated Jan. 6, 2010.
Office Action for U.S. Appl. No. 11/625,022, dated Jun. 22, 2010.
Office Action for U.S. Appl. No. 11/625,024, dated Jun. 18, 2010.
Office Action for U.S. Appl. No. 11/625,024, dated Nov. 27, 2009.
Office action from Chilean Patent Application No. 238-2007.
Office Action issued for U.S. Appl. No. 12/705,462, dated Nov. 6, 2012.
Office Action issued for U.S. Appl. No. 12/846,257, dated Nov. 16, 2012.
Padial et al., "Three-Dimensional Simulation of a Three-Phase Draft-Tube Bubble Column," *Chemical Engineering Science*, 55:3261-3273 (2000).
Rule 62 EPC Communication issued from the European Patent Office for Application No. 10741828.7, dated Jan. 31, 2013.
Rule 62 EPC Communication issued from the European Patent Office for Application No. 10805026.1, dated Feb. 27, 2013.
Rule 62 EPC Communication issued from the European Patent Office for Application No. 10805027.9, dated Feb. 5, 2013.
Sathyanarayana et al., Circular C.W. Intake System—A Research Opinion, Seventh Technical Conference of the British Pump Manufacturers Association, paper 21, pp. 293-313, 1981.
Schone, "Die Entolung des Abdampfes and der Kondensate von Kolbendampfmaschinen," *Braunkohle*, 31:82-92 (1932).
Screen shots from video on LFG website taken Jan. 18, 2011 (http://www.shawgrp.com/markets/envservices/envsolidwaste/swlfg).
Shaw LFG Specialties, LCC "Waste Heat Leachate Evaporator System" (2011).
Shaw LFG Specialties, LLC, 2006 Product Catalog.
Shimizu et al., "Filtration Characteristics of Hollow Fiber Microfiltration Membranes Used in Membrane Bioreactor for Domestic Wastewater Treatment," *Wat. Res.*, 30(10):2385-2392 (1996).
Smith, "Sludge-U-Like, As the Ban on Sea Disposal of Sewage Waste Looms, Technologies That Can Deliver Cleaner, Thicker and More Farmer-Friendly Sludges Are Gaining Popularity," *Water Bulletin*, 708 (1996).
St. Onge et al., "Start-Up, Testing, and Performance of the First Bulb-Type Hydroelectric Project in the U.S.A.," *IEEE Transactions on Power Apparatus Systems*, PAS-101(6):1313-1321 (1982).
Swaminathan et al., "Some Aerodynamic Aspects of Spouted Beds of Grains," Department of Chemical Engineering, McGill University, Montreal, Quebec, Canada, pp. 197-204 (2007).
Talbert et al., "The Elecrospouted Bed," *IEEE Transactions on Industry Applications*, vol. 1A-20, No. 5, pp. 1220-1223 (1984).

U.S. Office Action for U.S. Appl. No. 12/530,484, dated Apr. 16, 2013.
U.S. Office Action for U.S. Appl. No. 12/846,337, dated Apr. 17, 2013.
Williams et al., "Aspects of Submerged Combustion As a Heat Exchange Method," *Trans IChemE*, 71(A):308-309 (1993).
Written Opinion for Application No. PCT/US2010/024143, dated Oct. 12, 2010.
Written Opinion for Application No. PCT/US2012/021897, dated Sep. 28, 2012.
Ye et al., "Removal and Distribution of Iron, Manganese, Cobalt, and Nickel Within a Pennsylvania Constructed Wetland Treating Coal Combustion By-Product Leachate," *J. Environ. Qual.*, 30:1464-1473 (2001).
Yeh et al., "Double-Pass Heat or Mass Transfer Through a Parallel-Plate Channel with Recycle," *International Journal of Hat and Mass Transfer*, 43:487-491 (2000).
Yoshino et al., "Removal and Recovery of Phosphate and Ammonium as Struvite from Supernatant in Anaerobic Digestion," *Water Science and Technology*, 48(1):171-178 (2003).
Search Report for PCT/US2014/015007, mailed Nov. 12, 2014.
Written Opinion for PCT/US2014/015007, mailed Nov. 12, 2014.
Chinese Office Action for Application No. 201180014846.5, dated Jun. 18, 2013.
English translation of Chinese Office Action for Application No. 201080034380.0., dated Nov. 11, 2013.
English translation of Chinese Office Action for Application No. 2010800343800, dated Jul. 1, 2014.
English Translation of First Office Action in Russian Application No. 2012104408 dated Aug. 12, 2014.
English Translation of Office Action in Japanese Application No. 2012523024 dated Jul. 2, 2014.
EVRAS—Evaporative Reduction and Solidification Systems; Brochure for Web. Believed to be publically available as early as Mar. 5, 2010.
Gaudlip et al; "Marcellus Shale Water Management Challenges in Pennsylvania," SPE Shale Gas Production Conference, Fort Worth (2008).
Hill et al., "Produced Water and Process heat Combined Provide Opportunities for Shell CO2"; EVRAS; Facilities 2000: Facilities Engineering in the Next Millennium.
International Preliminary Report on Patentability for Application No. PCT/US2012/021897, dated Jul. 23, 2013.
International Search Report and Written Opinion for Application No. PCT/US2013/074971, dated May 22, 2014.
Intevras Technologies, LLC—Innovative solutions for water purification, remediation and process improvement; Power Point Presentation, Oct. 2009.
Japanese Office Action for Patent Application No. 2011-550282, dispatched on May 14, 2014.
Japanese Office Action for Patent Application No. 2012-552886, mailed Jan. 7, 2015.
Layne Evaporative Reduction and Solidification System Brochure (2010).
LFG Specialties, LLC, Waste Heat Leachate Evaporator System, Jan. 14, 2011.
Office Action for U.S. Appl. No. 13/649,535, dated Sep. 26, 2014, 8pgs.
Office Action for U.S. Appl. No. 12/530,484, dated Apr. 16, 2013.
Office Action for U.S. Appl. No. 12/530,484, dated Feb. 29, 2012.
Office Action for U.S. appl. No. 12/530,484, dated Oct. 17, 2012.
Office Action for U.S. Appl. No. 12/846,337, dated Apr. 17, 2013.
Search Report for Chinese Patent Application No. 201180014846.5, dated Jun. 8, 2013.

* cited by examiner

WASTEWATER PROCESSING SYSTEMS FOR POWER PLANTS AND OTHER INDUSTRIAL SOURCES

FIELD OF THE INVENTION

The present invention relates generally to methods, systems, and/or apparatuses for processing wastewater produced in thermoelectric power plants, other industrial plants, and/or other industrial sources.

BACKGROUND

Thermoelectric power plants, including hydrocarbon-fired power plants, such as coal, oil, and/or natural gas-fired power plants, and nuclear power plants, and other heavy industrial processes use very large amounts of water for performing various processes and for providing ancillary function. Often, the water is withdrawn from the surrounding environment, such as a nearby stream or lake, and the water is eventually returned to the stream or lake.

A problem is that the water often becomes contaminated with chemicals and/or other waste products from the industrial process, thereby forming wastewater. It is, therefore, often necessary to process this wastewater to remove some or all of the contaminants prior to returning the wastewater to the environment.

One particular source of wastewater often generated in a hydrocarbon-fired thermoelectric power plant is flue gas desulfurization ("FGD") purge water, or "blowdown". FGD purge water is a wastewater or slurry containing sulfur and/or other chemicals removed from a stream of flue gases, i.e., exhaust gases from a boiler or other hydrocarbon-fuel combustion process. FGD purge water is a byproduct of a flue gas desulfurization system, in which sulfur and other contaminates are removed from a flow of flue gases, usually in a component called an absorber. In the absorber, sulfur and/or other contaminants are removed from the flue gases, usually by spraying a stream of flue gases with a water-based slurry carrying various chemicals designed to help remove the sulfur and/or other contaminants from the gases. The slurry is collected after being sprayed into the stream of flue gas and typically is recycled many times through the absorber. FGD purge water is a wastewater stream that is drawn off of the slurry as the buildup of sulfur and/or other contaminants in the slurry increases, for example, to maintain the total dissolved solids ("TDS") in the slurry within some preselected range or under some preselected upper limit.

Another source of wastewater often generated in electrical power plants and other industrial plants is cooling tower purge water, or "blowdown." Similar to the FGD purge water, cooling tower purge water is wastewater containing dissolved solids that is drawn off of a supply of water used for cooling exhaust gases, usually to maintain the TDS in the cooling water within or under some preselected range or limits.

A further source of wastewater often generated in power plants is service water, which is used to cool various heat exchangers or coolers in the power house or elsewhere, other than the main condenser. As with the FGD purge water and the cooling tower purge water, the service water usually accumulates dissolved solids, the levels of which usually need to be controlled.

The service water, FGD purge water, and cooling tower purge water usually need to be treated to remove some or all of the dissolved solids before being returned to the environment or recycled for further use within the industrial plant.

SUMMARY

According to some aspects, one or more methods, systems, and/or apparatuses are disclosed for treating wastewater at a thermoelectric power plant with a wastewater concentrator including a direct contact adiabatic concentration system prior to returning the water to the surrounding environment or recycling the water for further use within the power plant. The methods, systems, and apparatuses may be applied to other processes that produce a stream of wastewater containing sulfur or other sour gas, for example, petrochemical refineries and/or natural gas processing plants.

According to other aspects, one or more methods, systems, and/or apparatus are disclosed for treating wastewater in a multi-stage treatment system, wherein a first stage includes a liquid evaporator operatively disposed in a reservoir of wastewater, and a second stage includes a wastewater concentrator operatively connected to the reservoir to receive wastewater from the reservoir. The multi-stage treatment system can be used as part of the systems for treating wastewater at a thermoelectric power plant, but is not limited to use in the thermoelectric power plant.

According to one exemplary aspect, a wastewater treatment system for a thermoelectric power plant includes a stream of wastewater generated in a thermoelectric power plant that is directed through a wastewater concentrator implementing a direct contact adiabatic wastewater concentrator system. A stream of hot feed gases is simultaneously directed through the wastewater concentrator. The wastewater concentrator mixes the hot feed gases directly with the wastewater and evaporates water from the wastewater to form water vapor and concentrated wastewater. The wastewater concentrator separates the water vapor from the concentrated wastewater. The wastewater concentrator exhausts discharge gases, including the water vapor and some or all of the feed gases. The discharge gases may be exhausted to atmosphere or to another component for further processing, recovery, or use. The remaining concentrated wastewater, or discharge brine, may be recycled through the wastewater concentrator for further concentrating and/or directed for further processing, recovery, and/or disposal.

According to another exemplary aspect, a method of processing wastewater from a thermoelectric power plant with a wastewater concentrator implementing a direct contact adiabatic wastewater concentrator system is disclosed. The power plant includes a source of wastewater and a source of hot feed gases. The method includes the steps of receiving a stream of the hot feed gases into the wastewater concentrator, receiving feed wastewater including the wastewater through a conduit from the thermoelectric power plant into the wastewater concentrator, mixing the hot feed gases directly with the feed wastewater in the wastewater concentrator to evaporate water vapor from the feed wastewater, separating the water vapor from the feed wastewater in the wastewater concentrator to form concentrated discharge brine and discharge gases, and exhausting the discharge gases from the wastewater concentrator.

According to a further exemplary aspect, a thermoelectric power plant includes thermoelectric generator, such as a boiler for generating steam to turn a turbine operatively connected to a generator for producing electricity and/or a gas turbine, a wastewater concentrator having a direct contact adiabatic wastewater concentrator system, a source of wastewater operatively connected to the wastewater concentrator to supply feed wastewater to the wastewater concentrator, and a source of hot feed gases operatively connected to the wastewater concentrator to supply the hot feed gases to the wastewater concentrator. The wastewater concentrator mixes the hot feed gases directly with the feed wastewater, evaporates water vapor from the feed wastewater, separates the water vapor from the feed wastewater thereby forming discharge brine and discharge gases, exhausts the discharge gases to atmosphere and/or another process component, and provides the discharge brine for further processing and/or disposal separate from the discharge gases.

In further accordance with any one or more of the foregoing exemplary aspects, a system, apparatus, and/or method for treating power plant wastewater and/or a multi-stage wastewater treatment system further optionally may include any one or more of the following preferred forms.

In some preferred forms, the wastewater includes purge water, service water, leachate, and/or holding reservoir water from the power plant. The purge water may include flue gas desulfurization purge water from the flue gas desulfurization system and/or purge water from a cooling tower.

In some preferred forms, the thermoelectric power plant includes a boiler having a hydrocarbon fired combustion heater for generating the steam, a first stream of flue gas from the combustion heater, and a flue gas desulfurization system. The flue gas desulfurization system may be operatively connected to the first stream of flue gas from the combustion heater. The flue gas desulfurization system may be arranged to remove sulfur and/or other contaminants from the flue gas, such as with an absorber, and to generate flue gas desulfurization purge water. The combustion heater may be hydrocarbon-fired, for example, with coal, oil, and/or natural gas. The wastewater concentrator may be operatively connected to the flue gas desulfurization system to receive feed wastewater including the flue gas desulfurization purge water. In some forms, the thermoelectric power plant includes other types of thermoelectric generators, such as a gas turbine. The gas turbine may be used, for example, alone as a primary electric generation plant and/or as a peak shaving or backup electric generation plant in combination with other types of thermoelectric generators.

In some forms, the thermoelectric power plant includes a cooling tower. The cooling tower generates the cooling tower purge water. The wastewater concentrator may be operatively connected to the cooling tower to receive feed wastewater including the cooling tower purge water.

In some forms, the thermoelectric power plant generates service water. The wastewater concentrator may be operatively connected to a source of the service water to receive feed wastewater including the service water for concentration.

In some forms, the wastewater concentrator may be operatively connected with a source of power plant leachate such that the power plant leachate is supplied to the wastewater concentrator for concentration.

In some preferred forms, the wastewater concentrator may be operatively connected with a holding reservoir such that water from the holding reservoir is supplied to the wastewater concentrator for concentration.

In some preferred forms, the hot feed gases include hot exhaust gases or other waste heat from one or more other processes within the power plant. The hot feed gases may be drawn from the first stream of flue gas, such as with a slip stream, from heated air from a combustion air pre-heater for the combustion heater, and/or include other hot gas streams. The hot feed gases may be pulled from the first stream at a temperature of between approximately 150° F. and approximately 800° F. The slip stream may draw from the first stream after the first stream has passed through a combustion air pre-heater for pre-heating combustion air for a burner. The slip stream may draw from the first stream before the first stream reaches the flue gas desulfurization system. The combustion heater may include any one or more of a coal-fired boiler, an internal combustion engine, a turbine stack, and other combustion devices. The boiler may include a boiler for producing feed steam for a turbine for an electric generator.

In some preferred forms, the hot feed gases are drawn from heated air produced by the combustion air pre-heater. The heated air from the combustion air pre-heater optionally may be further heated before being provided as hot feed gases, for example, with a flare or a burner.

In some preferred forms, the hot feed gases are direct fired by a flare or burner. The flare or burner may be dedicated for heating the hot feed gases to be provided to the wastewater concentrator.

In some preferred forms, the hot feed gasses are drawn from standby generation equipment, such as a standby gas turbine, or other peak shaving generation devices.

In some preferred forms, the hot feed gases are drawn from a plurality of different sources of heated air, including any one or more of the sources described herein.

In some preferred forms, the wastewater concentrator includes a device that mixes and evaporates the wastewater directly into the hot exhaust gases, such as a venturi evaporation device or draft tube evaporation. The wastewater concentrator may include any one or any combination of cross-flow gas-liquid separators, cyclonic gas-liquid separators, or wet electrostatic precipitators. The wastewater concentrator may be permanently installed in the electrical power plant. The wastewater concentrator may be portable and temporarily installed in the electrical power plant.

In some preferred forms that form a multi-stage wastewater treatment system the wastewater may be pre-processed at a first stage by additional wastewater processing systems prior to being provided for processing as feed wastewater in the wastewater concentrator at a second stage. The pre-processing may include a liquid evaporator operatively disposed in a reservoir of wastewater to evaporate at least some water from the wastewater prior to providing the wastewater to the wastewater concentrator. The reservoir may receive wastewater from the power plant, such as by one or more supply conduits. The reservoir may be operatively connected to the wastewater concentrator by one or more additional discharge conduits. The wastewater may flow into the reservoir from one or more processes in the power plant via the supply conduits. The wastewater may flow from the reservoir to the wastewater concentrator via the discharge conduits. The liquid evaporator is preferably connected to a source of forced air and vigorously mixes a discontinuous gas phase with a continuous phase of wastewater inside a partially enclosed vessel, such as by forming bubbles of air in a mass of the wastewater. The forced air may be heated, for example, by waste heat sources within the power plant, such flue gas or other waste heat sources. The liquid evaporator may pre-process the wastewater to provide a more concentrated feed wastewater to the wastewater concentrator than by simply the wastewater directly from the various processes in the power plant as feed wastewater. The combination of a liquid evaporator used at a first stage to pre-process feed wastewater for the wastewater concentrator at a second stage may be implemented in other use environments in addition to the thermoelectric power plant of the examples.

In some preferred forms, the concentrated discharge brine produced by the wastewater concentrator is post-processed by additional processing systems and/or methods. The discharge brine may be de-watered in a post-treatment process. Liquid removed from the discharge brine in the post-treatment process may be recycled to the wastewater concentrator to be processed again.

In some preferred forms, an electrostatic precipitator (ESP), wet electrostatic precipitator (WESP), and/or a bag filter is operatively connected to the first stream of flue gas or the slip stream of flue gas. The ESP, WESP, or bag filter may be arranged to remove fly ash and/or other contaminates from the flue gas before the flue gas enters the wastewater concentrator.

In some preferred forms, the discharge gases exhausted from the wastewater concentrator are conducted to one or more additional emissions control systems for further processing prior to release to atmosphere. The discharge gases from the wastewater concentrator may be heated or re-heated before returning to the plant's exhaust stream. The discharge gases may be heated or re-heated with any, or any combination of burners, electric heaters, or other streams of heated gases. The discharge gases may be heated above an acid-gas condensation temperature. The discharge gases may be returned to the flue gas desulfurization system. The discharge gases may also or alternatively be exhausted directly to atmosphere without further processing or recapture.

Other aspects and forms will become apparent upon consideration of the following detailed description and in view of the appended claims.

DETAILED DESCRIPTION

Figure 1:
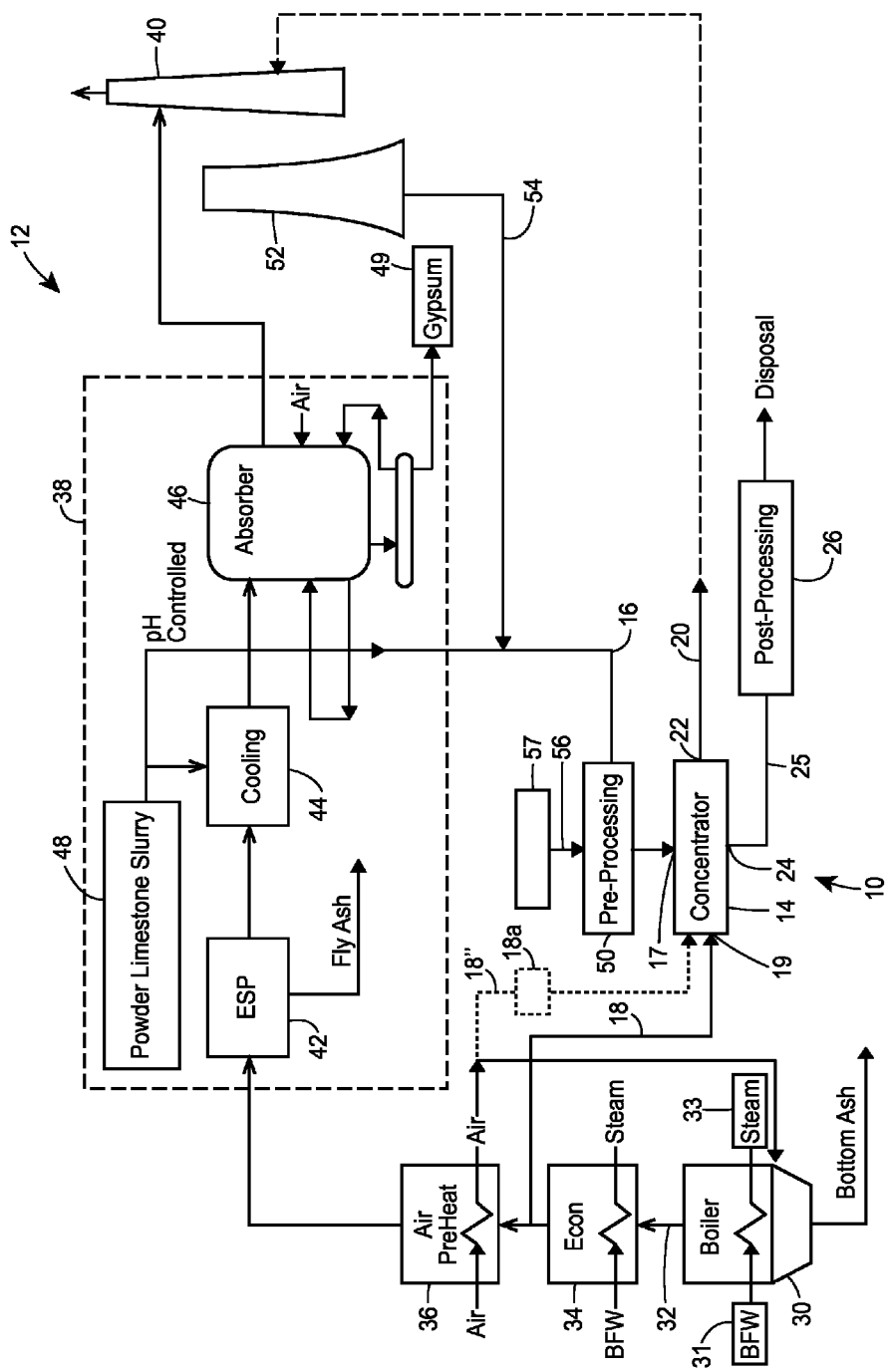
FIG. 1 is a schematic diagram of an exemplary hydrocarbon-fired thermoelectric power plant including a system for treating wastewater generated by the plant according to some aspects of the present disclosure.

Turning now to the drawings, FIG. 1 shows an exemplary wastewater treatment system 10 for treating power plant wastewater at a thermoelectric power plant 12. The system 10 includes a wastewater concentrator 14. The wastewater concentrator 14 is operatively connected, such as through a conduit 16, to a stream of wastewater produced by one or more processes within the thermoelectric power plant 12 at a first inlet 17. The wastewater concentrator 14 is also operatively connected, such as through a conduit 18, to a stream of hot feed gases at a second inlet 19. The wastewater concentrator 14 includes a direct contact adiabatic concentration system, wherein the wastewater concentrator 14 mixes a stream of the hot feed gases from the conduit 18 directly with a stream of the wastewater from the conduit 16 and evaporates water from the wastewater to form water vapor and concentrated wastewater. The wastewater concentrator 14 separates the water vapor from remaining concentrated wastewater from the feed wastewater. The wastewater concentrator 14 exhausts discharge gases, including the water vapor and some or all of the now-cooled feed gases, in a stream of exhaust vapor, such as through a conduit 20, from an exhaust outlet 22. The discharge gases may be exhausted to atmosphere, to the plant exhaust system, such as through a gas flue exhaust stack 40, or to another component (not shown) for further processing, recovery, or use. The wastewater concentrator 14 discharges a discharge brine of the concentrated wastewater through a brine discharge outlet 24 that is preferably operatively connected with a conduit 25 arranged to transport the discharge brine away from the wastewater concentrator 14. The conduit 25 optionally operatively connects the discharge brine outlet 24 to a post-processing system 26 for further processing of the discharge brine and/or disposal. In some arrangements, the brine discharge outlet 24 is also or alternatively operatively connected to the first inlet 17 or a third inlet (not shown) to re-cycle the discharge brine through the wastewater concentrator 14 for further processing and concentration.

In a preferred arrangement, the system 10 results in zero liquid discharge from the thermoelectric power plant 12. In this arrangement, discharge brine from the wastewater concentrator 14 may be recycled through the wastewater concentrator 14 until the discharge brine reaches a saturation level of TDS or even a super saturation level of TDS. The discharge brine may then be further processed by the post processing system 26, with one or more additional dewatering systems, and/or other water and/or solids removal systems, for example using a compression-type de-watering system, until all or substantially all of the water has been separated from the solids. As the water is separated from solids and continuously returned to the wastewater concentrator this mode of operation allows zero liquid discharge (ZLD) as the remaining solids can be disposed of in any desirable and appropriate manner.

The thermoelectric power plant 12 may be any type of power plant, such as a nuclear power plant or a hydrocarbon-fired power plant. In the exemplary arrangement shown in the drawings, the thermoelectric power plant 12 is a hydrocarbon-fired power plant. The thermoelectric power plant 12 includes one or more combustion heaters 30, such as boilers, for heating boiler feed water 31 into steam 33 to turn a generator turbine (not shown). The boiler 30 discharges a main stream 32 of hot flue gases that passes sequentially through an economizer 34 operatively connected to the boiler 30, an air pre-heater 36 for pre-heating boiler combustion feed air, a flue gas desulfurization system ("FGD") 38 for removing fly ash and sulfur dioxide from the flue gas, and a flue gas exhaust stack 40 for exhausting the flue gas to atmosphere. The boilers 30 may be coal-fired, gas-fired, gas-fired and/or oil-fired.

In some optional arrangements, the exemplary FGD system 38 includes a fly ash removal device 42, such as fabric bag filter, electrostatic precipitator ("ESP") or wet electrostatic precipitator ("WESP"), operatively connected to the air pre-heater 36, a wet scrubber 44 operatively connected to the fly ash removal device 42, and an absorber 46 for removing sulfur oxides operatively connected to the wet scrubber 44. As is well understood in the art, a sorbent slurry, such as a slurry containing powder limestone, is circulated through the absorber 46 and mixed with the flue gas to draw and precipitate sulfur oxides (SO$_x$) and/or other contaminants out of the flue gas. As the slurry is re-circulated through the absorber, the TDS in the slurry increases. To maintain the slurry within a preselected range or under a preselected maximum TDS concentration, a small amount of the slurry with high TDS concentration is drawn out of the absorber while fresh makeup sorbent slurry 48 with lower TDS concentration is provided into the absorber 46 to maintain the desired TDS concentration of the slurry being circulated through the absorber 46. A product of the SO$_x$ precipitate, gypsum 49, can be drawn out from the absorber 46 for subsequent use, sale, or disposal.

The thermoelectric power plant 12 and the FGD system 38 described herein are meant only to provide sufficient exemplary background for understanding how the wastewater treatment system 10 can be integrated into the thermoelectric power plant 12 to treat the wastewater produced therein. It is understood that the thermoelectric power plant 12 and the FGD system 38 may include additional and/or alternative components in a manner well understood in the art and not the further subject of this application.

The high TDS concentration slurry drawn from the absorber 46, called flue gas desulfurization (FGD) purge water, or "blowdown," is operatively conducted via one or more conduits 16 to the inlet 17 to be supplied as feed wastewater to the wastewater concentrator 14. Hot feed gases are also supplied to the inlet 19 by one or more conduits 18 for direct mixing with the feed wastewater inside the wastewater concentrator 14. Preferably, both the hot feed gases and the feed wastewater are supplied to the wastewater concentrator 14 continuously and simultaneously to promote continuous direct mixing and evaporation.

In an optional multi-stage system, the FGD purge water optionally undergoes some pre-processing before entering the wastewater concentrator 14. For example, the conduit 16 optionally operatively connects the absorber 46 and a piece of pre-processing equipment 50 to deliver the FGD purge water to the pre-processing equipment 50 forming a first stage. The conduit 16 operatively connects the pre-processing equipment 50 and the inlet 17 to deliver the feed wastewater to the wastewater concentrator 14 after processing in the pre-processing equipment 50, thereby forming a second stage. The pre-processing equipment 50 may be any type of pre-processing system that is not incompatible with the eventual processing of the feed wastewater in the wastewater concentrator 14. In other arrangements, the feed wastewater is not pretreated, in which case the pre-processing equipment 50 is omitted and the conduit 16 connects directly to the wastewater concentrator 14.

In some optional arrangements, cooling tower purge water additionally or alternatively is drawn from cooling water from a cooling tower 52 and supplied in the feed wastewater to the wastewater concentrator 14. For example, a conduit 54 operatively connects the cooling tower 52 to the inlet 17 by operatively connecting with the conduit 16 or directly to the inlet 17. The conduit 54 optionally is operatively connected to the pre-processing equipment 50 to conduct the cooling tower purge water to and through the pre-processing equipment 50 before the cooling tower purge water is supplied to the wastewater concentrator 14 as part of the feed wastewater.

In some optional arrangements, service water from other various processes and equipment additionally or alternatively is supplied in the feed wastewater to the wastewater concentrator 14. For example, a conduit 56 operatively connects service water, which is collected at various locations and/or other equipment within the plant shown generally at 57, to the wastewater concentrator 14. The conduit 56 optionally is operatively connected to the conduit 16, the pre-processing equipment 50 to pre-process the service water before entering the wastewater concentrator 14, and/or directly to the feed wastewater entering the inlet 17. Thus, service water from throughout the plant may be additionally or alternatively supplied to the wastewater concentrator 14 in a similar manner. In another example, the thermoelectric power plant 12 may generate power plant leachate, such as leachate or runoff from a waste disposal area, such as a landfill area, where solid or semi-solid waste products, such as gypsum, fly ash, and/or other waste products, are held. In such case, the wastewater concentrator 14 in some arrangements can be operatively connected with a source of the power plant leachate such that the power plant leachate is supplied to the wastewater concentrator 14 for processing. In a further example, the thermoelectric power plant may include one or more holding reservoirs for mixed water and waste materials, such as a holding pond, evaporation pond, settling pond, or open-topped settling tank, which holds water that may include various waste materials. In such case, the wastewater concentrator 14 may be operatively connected with the holding reservoir such that water from the holding reservoir is supplied to the wastewater concentrator 14 for processing. The sources of power plant leachate and the holding reservoir may also be schematically identified at 57. Thus, it is understood that the feed wastewater supplied to the wastewater concentrator 14 may include any one or more of the exemplary sources of wastewater described herein and/or may include other types of wastewater that may be produced or found at a power plant.

The hot feed gases in some optional arrangements are heated with waste heat from other processes in the power plant 12 and/or by a dedicated heating system. In the exemplary arrangement shown in FIG. 1, the hot feed gases are heated either directly or indirectly with a slip stream of flue gases diverted from the main stream 32 of flue gases, such as along the conduit 18. The slip stream may be pulled from one or more different locations along the main stream 32. In the exemplary arrangement, the conduit 18 is operatively connected to the main stream 32 to draw off hot flue gases between the economizer 34 and the air pre-heater 36. However, the conduit 18 may also or alternatively be operatively connected to the main stream 32 to draw off hot flue gases between the boiler 30 and the economizer 34, between the air pre-heater 36 and the fly ash removal device 42, between the fly ash removal device 42 and the wet scrubber 44, and/or between the wet scrubber 44 and the absorber 46. The hot feed gases may have a temperature of between approximately 150° F. and approximately 800° F. depending on where the slip stream is connected to the main stream 32 and whether the heating arrangement for the hot gas is direct or indirect. The hot flue gases may be provided directly into the wastewater concentrator 14 and/or may be used to indirectly heat clean or cleaner gases/air, such as through a heat exchanger. Other sources of waste heat inside the power plant 12, such as from flares, burners, steam condensers, and engines, may also or alternatively be used to heat the hot feed gases supplied to the wastewater concentrator 14 at the inlet 19. In one arrangement, the hot feed gases are drawn from heated air produced by the combustion air pre-heater 36, as shown at optional conduit 18" operatively connecting the combustion air pre-heater 36 with the wastewater concentrator 14. The heated air from the combustion air pre-heater 36 optionally may be further heated before being provided as hot feed gases, for example, with a flare or a burner 18a operatively disposed along the conduit 18". The conduit 18" may connect directly to the inlet 19 or may be operatively connected to the inlet 19 through, for example, a connection with the conduit 18. In addition or alternatively, the hot feed gases may be direct fired by a flare or burner, which may be dedicated for heating the feed gases, prior to being supplied to the inlet 19. In another arrangement, the wastewater concentrator 14 is operatively connected to a piece of standby electrical generation equipment, such as a standby gas turbine or other peak shaving electrical generation device (not shown), such that hot waste gases or heated air generated by the equipment is supplied to the wastewater concentrator 14 for heating the feed wastewater in a similar manner as described herein. It is also contemplated that, in some arrangements, the wastewater generator 14 is operatively connected to a plurality of different waste heat sources, such as any one or more of the waste heat sources described herein or other waste heat sources, so as to provide hot feed gases to the inlet 19 for heating the feed wastewater. An advantage of using waste heat from other processes in the power plant 12, such as the hot flue gas from the boiler 30, may be gaining more efficiencies and/or reducing negative environmental impact by reducing the loss of unused waste heat to the atmosphere.

Figure 2:
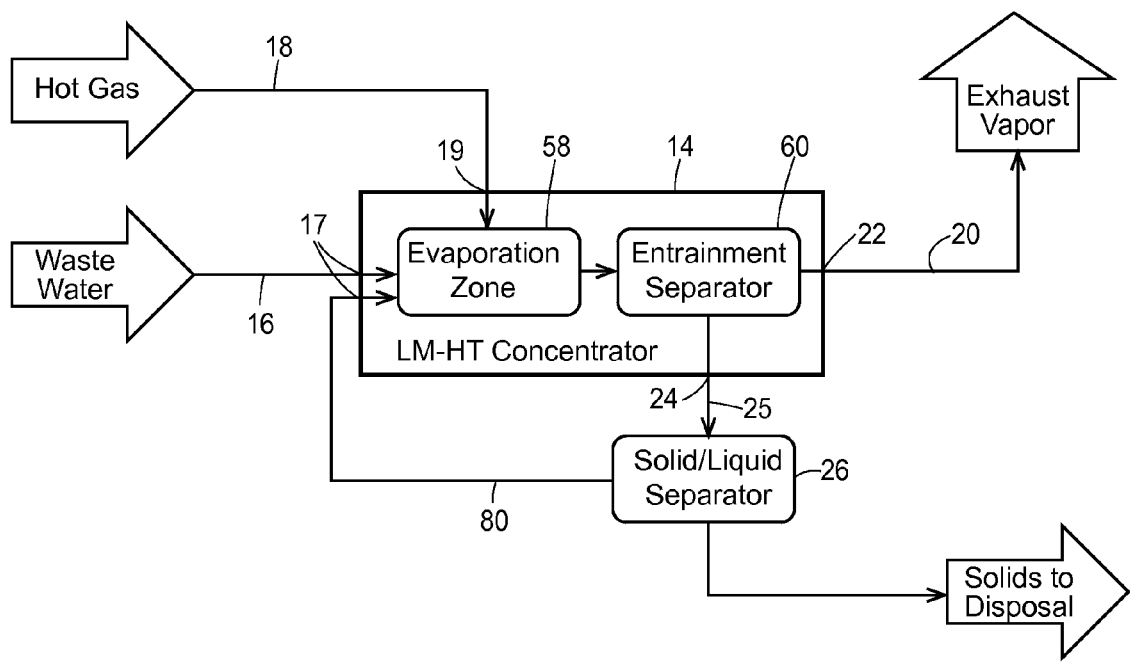
FIG. 2 is a schematic diagram of an exemplary system for treating plant wastewater usable in the power plant of FIG. 1.

As seen diagrammatically in FIG. 2, the wastewater concentrator 14 incorporates a direct contact adiabatic concentration system. The wastewater concentrator 14 includes the wastewater feed inlet 17, the hot feed gas inlet 19, a direct contact evaporative section 58, a gas-liquid separator 60, the gas discharge outlet 22, and the brine discharge outlet 24. The wastewater feed inlet 17 and the hot feed gas inlet 19 open into the direct contact evaporative section 58. In the direct contact evaporative section 58, hot feed gas and feed wastewater are directly contacted with each other, such as by direct intermixing, to form a high-surface area gas-water interface from which water from the feed wastewater evaporates into the feed gases without requiring the addition of dedicated heat energy, such as from a burner, to achieve rapid evaporation of the water into the feed gases. Rather, rapid evaporation is achieved by forming the high surface area gas-water interface by, for example, rapid mixing of a continuous air volume with a discontinuous water volume, such as through a venturi device as shown and described in any of U.S. patent application Ser. No. 13/548,838, filed Jul. 13, 2012, U.S. patent application Ser. No. 12/705,462 filed, Feb. 12, 2010, and U.S. Patent Application No. 61/673,967, filed Jul. 20, 2012, or by rapid mixing of a continuous water volume with a discontinuous air volume, such as in a submerged gas evaporator with a draft tube as described in U.S. Pat. No. 7,416,172. In one preferred arrangement, the wastewater concentrator 14 includes one or more aspects of the LM-HT® wastewater evaporator, offered by Heartland Technology Partners, LLC, of 9870 Big Bend Blvd, St. Louis, Mo. The wastewater concentrator 14 may include any one or more aspects and features disclosed in the above-indicated patents and patent applications, each of which is incorporated by reference herein in its entirety. The direct contact evaporative section 58 is operatively connected to the gas-liquid separator 60, for example with a conduit and/or opening, to allow the mixed gases, which includes the feed gas and water vapor evaporated from the wastewater, and the wastewater entrained therein to travel into the gas-liquid separator 60. The wastewater entrained in the mixed gases exiting the direct contact evaporative section 58 is separated from the mixed gases in the gas-liquid separator 60. The gas-liquid separator 60 may be a cross-flow gas-liquid separator, wherein a stream of the mixed gases and entrained liquids is forced through one or more demister panels to separate the entrained liquids from the gases. Alternatively, the gas-water separator 60 may be a cyclonic gas-liquid separator, or a combination of cross-flow and cyclonic gas-liquid separators. Within cyclonic gas-liquid separators, a stream of gases and entrained liquids is forced through a cyclone chamber to separate entrained liquids from the gases. In one arrangement, the wastewater concentrator 14 is sized to have a processing through rate of approximately 30 gallons per minute (gpm) of feed wastewater, including new wastewater and recycled wastewater from the discharge brine, and/or produces a discharge brine having between approximately 30% and 60% TDS. In other arrangements, the wastewater concentrator 14 may be sized to have a higher processing through rate, for example of 60 gpm, 100 gpm, 200 gpm, or more, a lower processing through rate, for example of 30 gpm or less, and any processing through rate within these ranges. The wastewater concentrator 14 is preferably permanently installed in the thermoelectric power plant 12. Alternatively, the wastewater concentrator 14 is portable and may be temporarily installed in the thermoelectric power plant 12.

Figure 4:
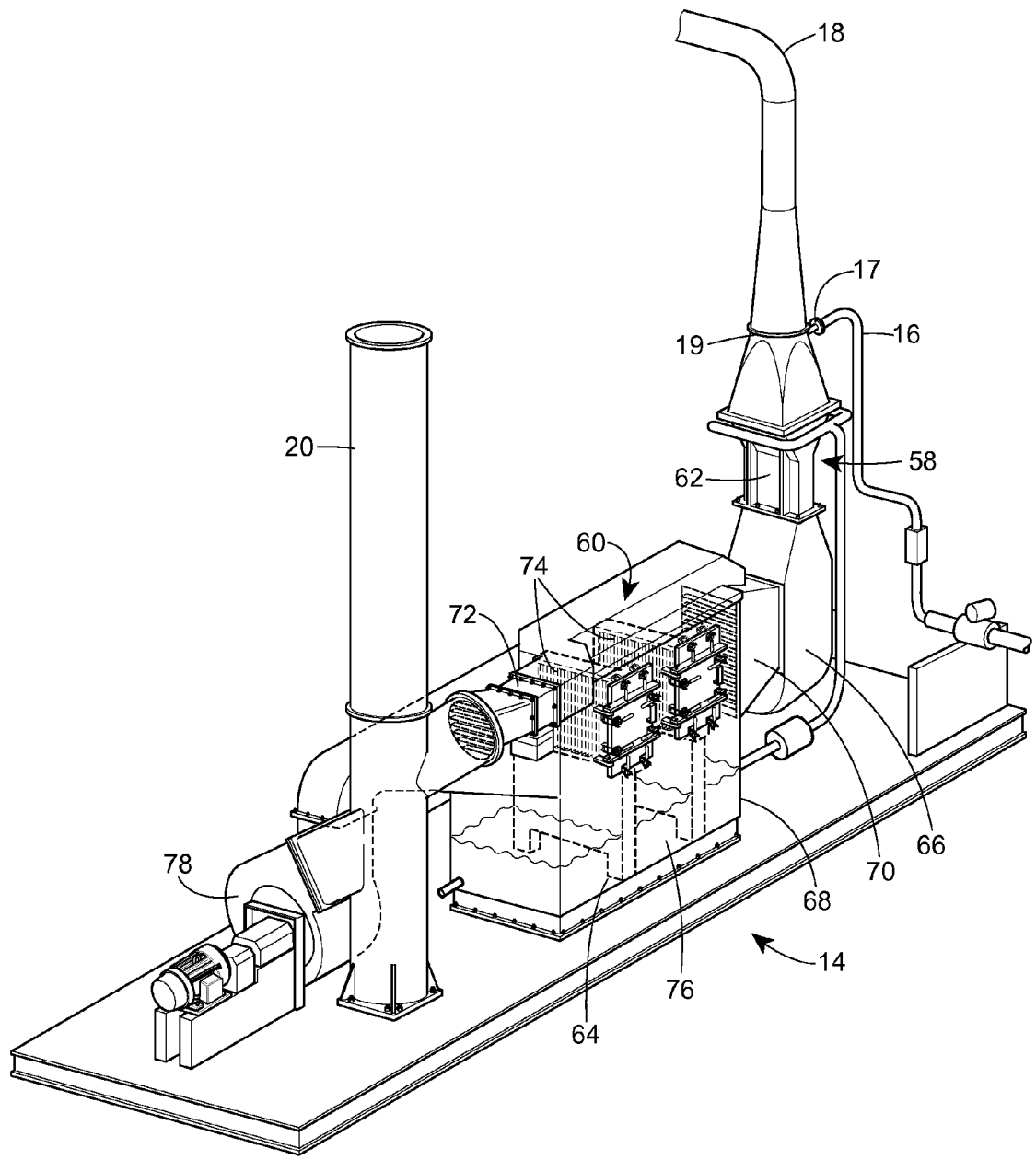
FIG. 4 is an isometric partial cut-away view of an exemplary wastewater concentrator adaptable for use in any one of the systems of FIGS. 1-3.

FIG. 4 shows one exemplary arrangement of the wastewater concentrator 14 that incorporates a direct contact adiabatic concentration system, wherein the direct contact evaporative section 58 includes a venturi device 62 and the gas-liquid separator 60 includes a cross flow gas-liquid separator 64. The conduit 18 is connected to the inlet 19, which opens into the venturi device 62 to supply hot feed gases into the wastewater concentrator 14. The conduit 16 is connected to the inlet 17, which opens into the venturi device 62 to supply feed wastewater into the wastewater concentrator 14. The hot feed gases and the feed wastewater are forced through a narrowed throat of a venturi, which increases velocity compared to the velocity of gases through the conduit 18, where the hot feed gases and the feed wastewater are thoroughly mixed together to cause rapid evaporation of water vapor. From the throat of the venturi device 62, the mixed wastewater and gases are directed through a conduit 66 into the cross flow gas-liquid separator 64. The cross flow gas-liquid 64 separator includes an outer shell 68 forming an interior space, an inlet port 70 into the interior space, and an outlet port 72 out of the interior space, and a plurality of demister panels 74 disposed in the interior space between the inlet port 70 and the outlet port 72. The demister panels 74 are vertically suspended at 90° to, and across the gas flow path between the inlet port 70 and the outlet port 72 arranged to collect entrained wastewater carried by the gases flowing through the interior space and deposit the collected wastewater in a sump 76 at the bottom of the interior space. The conduit 20 is connected to the outlet port 72, and a fan 78 is optionally operatively connected to the conduit 20 to impart a negative pressure across the interior space to draw the gases through the wastewater concentrator 14. Additional details regarding this exemplary wastewater concentrator 14 are found in the U.S. patent application Ser. No. 12/705,462 mentioned previously herein.

With reference again to FIGS. 1 and 2, in an exemplary method, wastewater produced by various processes in the thermoelectric power plant 12, such as purge water from the FGD system 38 and/or the cooling tower 52 and/or service water, is processed within the wastewater concentrator 14 according to the following preferred exemplary process steps. A stream of hot feed gases is provided to the wastewater concentrator 14 with the conduit 18 operatively connected to the inlet 19. Preferably, the conduit 18 is operatively connected to the main flue gas stream 32 so that the hot feed gases are heated with waste heat from the boiler 30. A stream of feed wastewater, including one or more of the purge waters and/or service water, is provided to the wastewater concentrator 14 through one or more conduits 16 operatively connected to one or more inlets 17. The conduit 16 is operatively connected to one or more sources of the purge waters and/or service water. The hot feed gases are mixed directly with the feed wastewater inside the wastewater concentrator 14, such as in the direct contact evaporative section 58, to evaporate water vapor from the feed wastewater. Preferably, the hot feed gases and the feed wastewater are mixed by being directed through a venturi device. The water vapor and gases are then separated from entrained concentrated wastewater in the wastewater concentrator 14, such as inside the gas-liquid separator 60, thereby forming a concentrated discharge brine and discharge gases. The discharge brine includes the concentrated wastewater separated from the water vapor and the gases. The discharge gases include the gases and the water vapor. Thereafter, the discharge gases are exhausted from the wastewater concentrator 14, such as through the exhaust outlet 22 and through the conduit 20. The discharge brine is discharged, either periodically or continuously, from the wastewater concentrator 14 through the discharge outlet 24.

In one option, the discharge brine is supplied to the post-processing equipment 26, including a solid-liquid separator. The solid-liquid separator separates solids and liquids in the brine. The liquids are returned, for example with a return conduit 80 operatively connecting the solid-liquid separator to one of the inlets 17, for reprocessing through the wastewater concentrator 14. The solids are removed from the solid-liquid separator for further processing, repurposing, and/or disposal.

Figure 3:
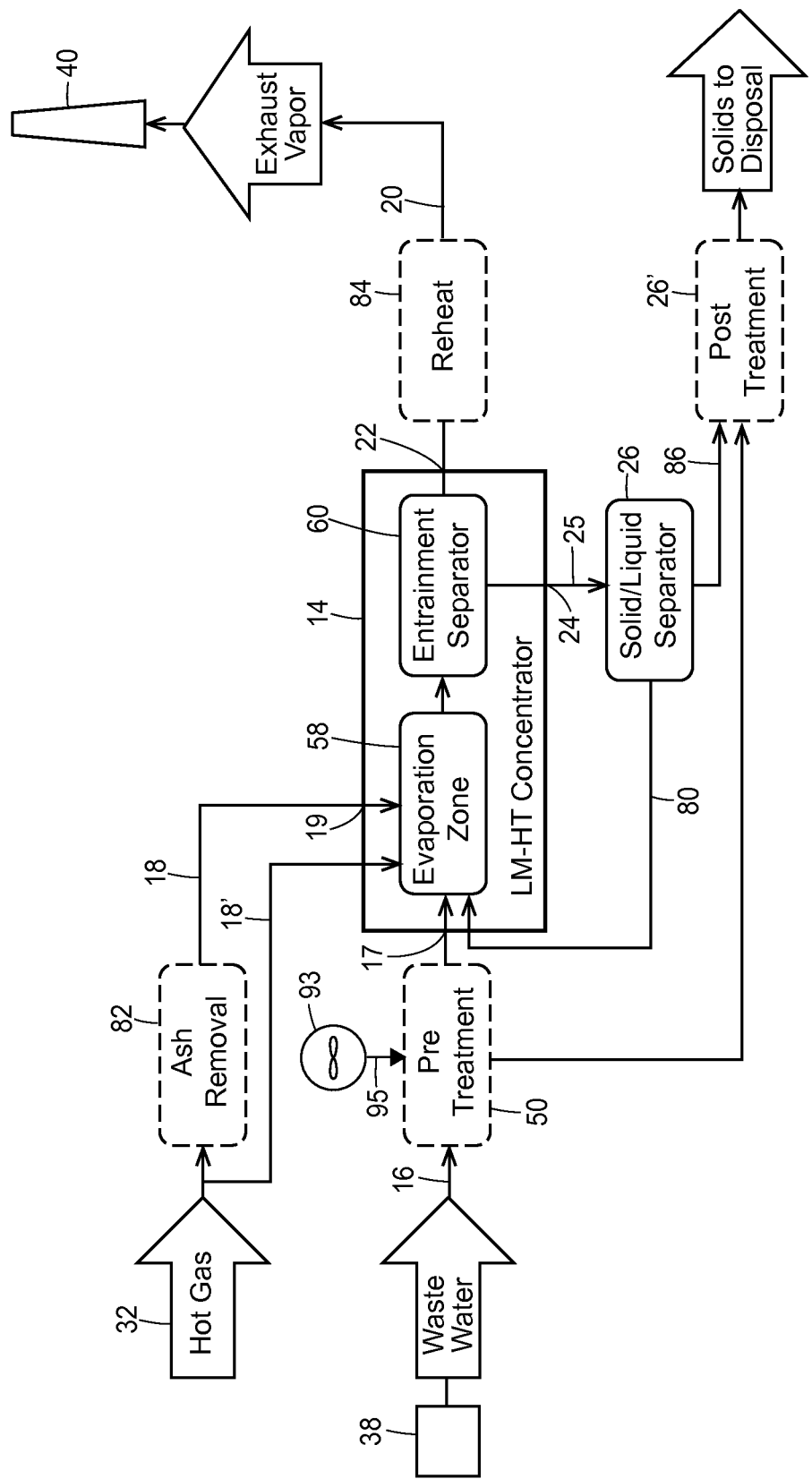
FIG. 3 is a schematic diagram of the exemplary system of FIG. 2 with additional optional features shown.

Turning to FIG. 3, in addition to the process steps described previously, additional and alternative optional exemplary processing steps are shown for processing the wastewater from the thermoelectric power plant 12 with the wastewater concentrator 14. In this exemplary arrangement, the conduit 16 is operatively connected to the FGD system 38 to supply FGD purge water as part of the feed wastewater supplied to the inlet 17 of the wastewater concentrator 14. The FGD purge water is pre-treated, such as by the pre-processing equipment 50 operatively disposed along the conduit 16, prior to entering the wastewater concentrator 14. The conduit 18 is operatively connected to the main flue gas stream 32. A fly ash removal device 82, such as an ESP, WESP, or filter bag, is preferably operatively disposed along the conduit 18 to remove and/or reduce fly ash and/or other particulates from the flue gas prior to entering the wastewater concentrator 14. Alternatively or additionally, hot flue gases from the main flue may be provided to the wastewater concentrator 14 without being treated, such as by a conduit 18' having a first end operatively connected to the main flue gas stream 32 and a second end operatively connected to the inlet 19 of the wastewater concentrator 14. In some arrangements, a controlled amount of fly ash may be provided into the feed wastewater, either by reintroduction into or incomplete removal from, the stream of feed wastewater. The conduit 20 is operatively connected with additional emission control equipment, such as a reheater 84. The discharge gases are conducted to the reheater 84 via the conduit 20. The reheater 84 heats or re-heats the discharge gases from the wastewater concentrator 14, such as with a flare, burner, or another stream of heated gases, preferably to a temperature above an acid-gas condensation temperature appropriate for the makeup of the discharge gases. Thereafter, the re-heated discharge gases are returned to the plant exhaust system, such as to the exhaust stack 40, and/or are returned for re-use in other equipment within the plant, such as the FGD system 38. Further, solids removed from the solid-liquid separator 26 are directed, such as by a conduit 86, to additional post-processing equipment 26' for further treatment. The solids are removed from the post-processing equipment 26' and transported away for disposal, such as sale, repurposing, landfilling, etc.

Figure 5:
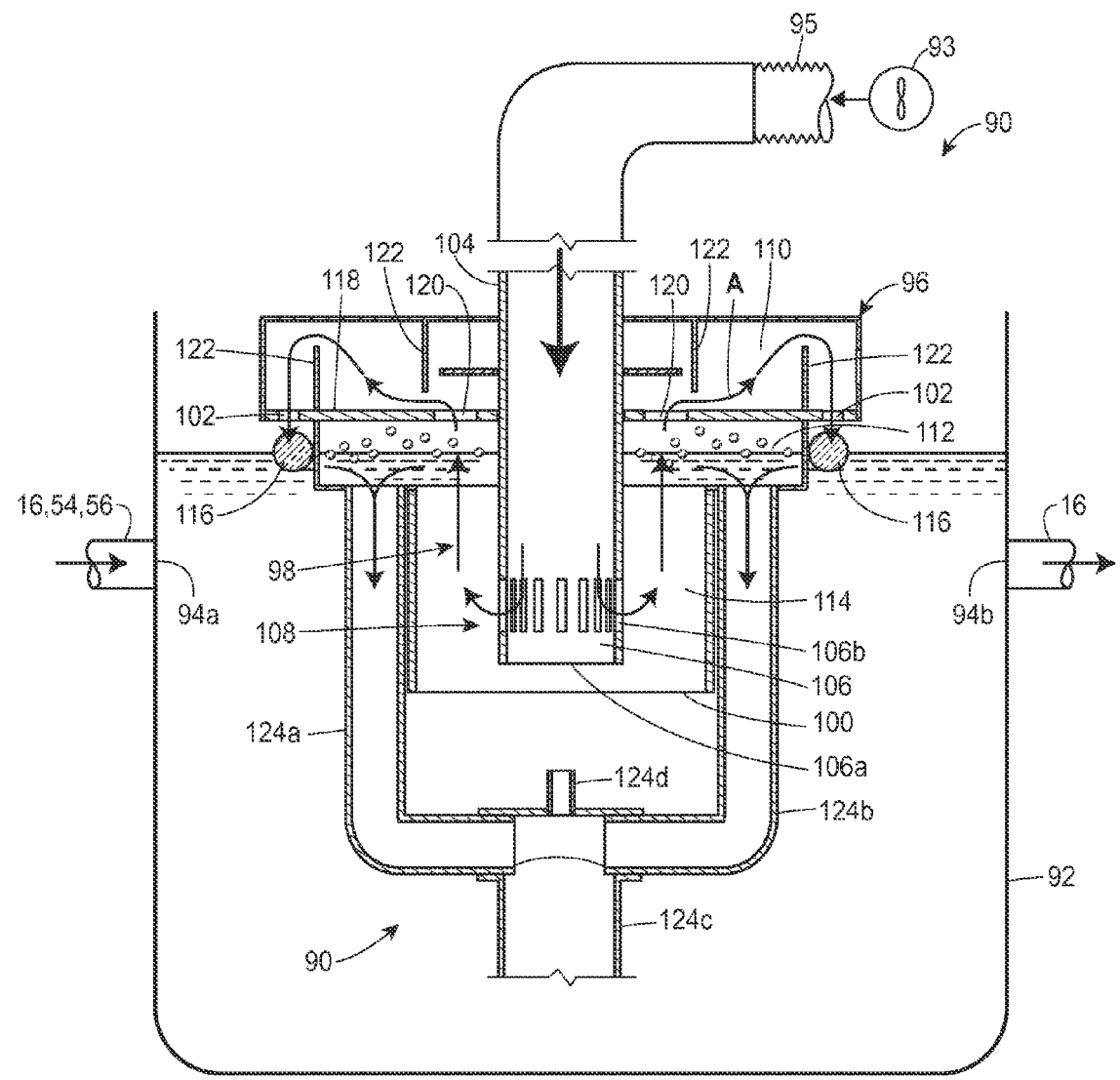
FIG. 5 is a cross-sectional view of pre-processing equipment in accordance with teachings of the present disclosure including a liquid evaporator operatively disposed in a reservoir.
Figure 6:
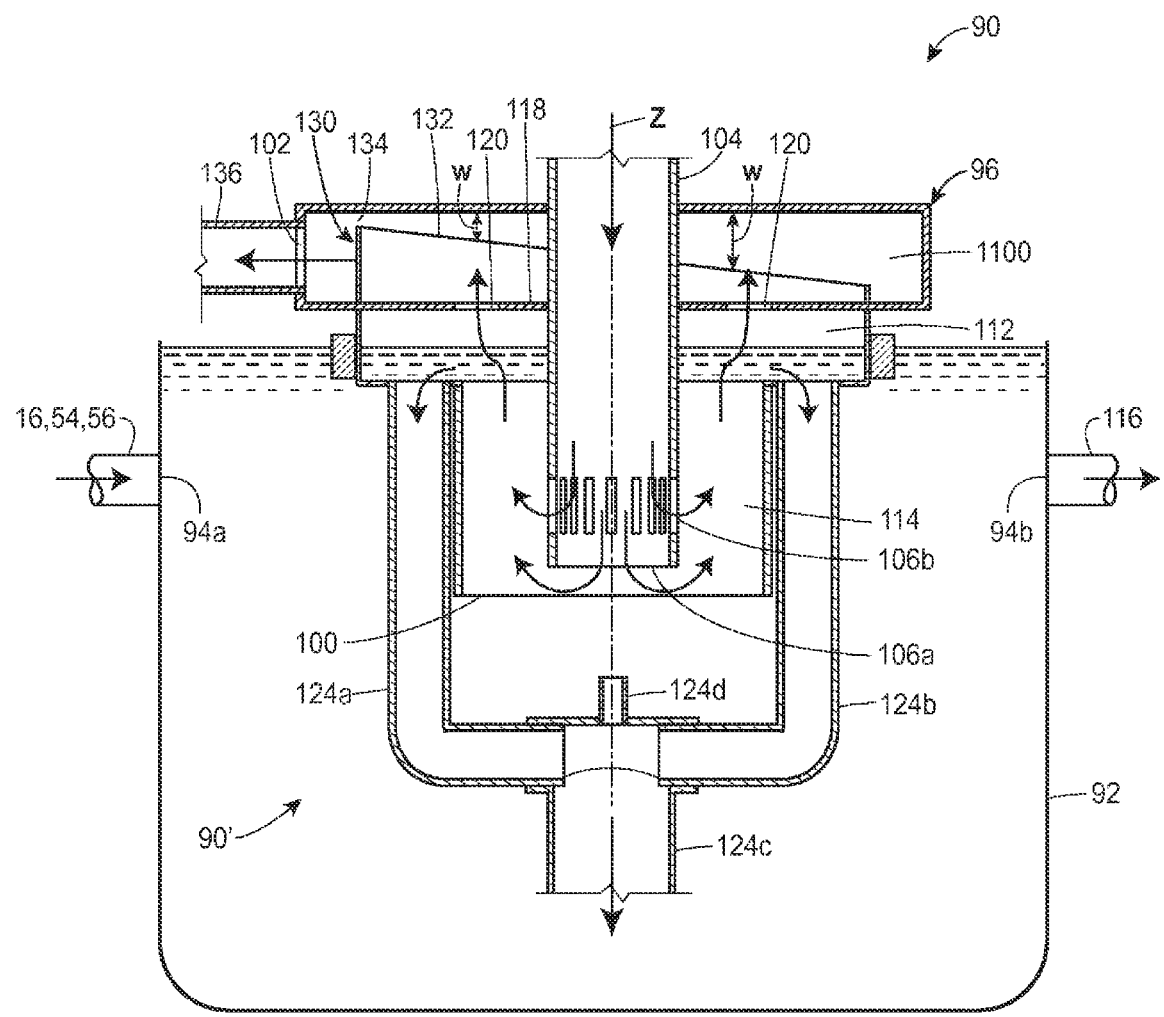
FIG. 6 is a cross-sectional view of pre-processing equipment in accordance with teachings of the present disclosure including another liquid evaporator operatively disposed in a reservoir.
Figure 7:
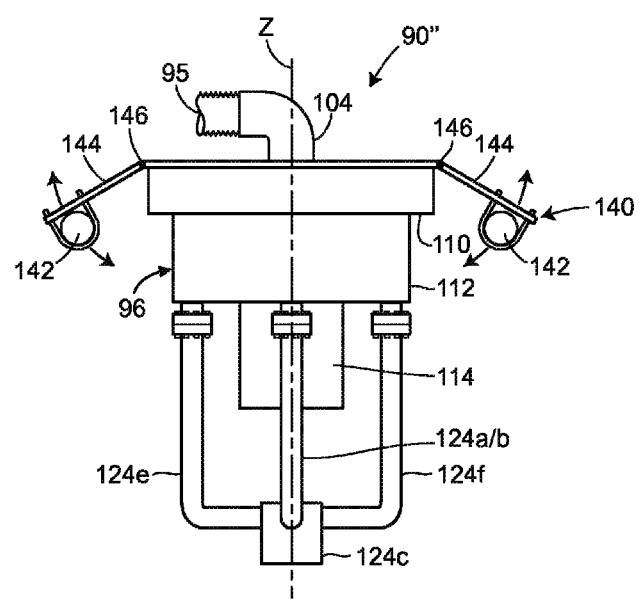
FIG. 7 is a side elevation view of another liquid evaporator usable in a reservoir as pre-processing equipment.

Turning to FIG. 5, in some preferred arrangements, the pre-processing equipment 50 shown in FIGS. 1 and 3 includes one or more contained air-water interface liquid evaporators, such as liquid evaporators 90, 90', and/or 90", operatively disposed in a reservoir 92 of wastewater obtained from one or more of the processes within the power plant 12. The reservoir 92 may be a tank or a pond open to the environment, for example. At least one or more sources of wastewater from the power plant 12, such as the conduits 16, 54, and/or 56, are operatively connected to one or more inlets 94a into the reservoir 92 to provide wastewater from the power plant 12 into the reservoir 92. Another portion of the conduit 16 operatively connects one or more outlets 94b of the reservoir 92 to the inlet 17 of the wastewater concentrator 14 to transfer the wastewater from the reservoir 92 to the wastewater concentrator 14. The wastewater may include FGD purge water, cooling tower purge water, service water, power plant leachate, and/or holding reservoir water, as described previously herein. The liquid evaporator 90 is also operatively connected to a source of forced air, such as a fan 93. The forced air optionally is heated by one or more sources of waste heat in the power plant in a manner as described elsewhere herein. Preferably, the fan 93 is operatively connected by a conduit 95 to blow the air into the liquid evaporator. The fan 93 may be, for example, any type of blower sufficient and arranged to force the hot gases the air into the liquid evaporator 90 so as to achieve vigorous air-water mixing as described in more detail below. The liquid evaporator 90 pre-treats the power plant wastewater by evaporating some water out of the wastewater, thereby providing a more concentrated stream of the wastewater to be supplied into the wastewater concentrator 14. Thus, using the liquid evaporator 90 as part of a pre-treatment step at the pre-processing equipment 50 can improve the output of the wastewater concentrator 14 by reducing the treatment time to obtain the desired degree of concentration for brine discharged from the wastewater concentrator 14. Further, heating the air forced into the liquid evaporator 90, for example, with waste heat from the power plant, improves the effectiveness of the liquid evaporator 90. If the air is heated from waste heat produced in the power plant 12, the liquid evaporator 90 may further improve the energy efficiency of the power plant 12. In addition, other exemplary contained air-water interface liquid evaporators, such as the liquid evaporators 90' and/or 90" as shown in FIGS. 6 and 7, may additionally or alternatively be operatively disposed in the reservoir 92 to pre-treat the wastewater at the pre-processing equipment 50. Although described in relation to use in the environment of the power plant 12, any one of the liquid evaporator 90, 90', 90" may be used to pre-process wastewater prior to being provided for processing in the wastewater concentrator 14 as part of a wastewater treatment system in other industrial settings, either alone or in combination with other devices. Thus, the combination of a liquid evaporator 90, 90', or 90" as a pre-processing device for wastewater being processed by the wastewater concentrator 14 is not limited to use in the power plant 12. A brief description of each of the exemplary liquid evaporators 90, 90', and 90" is provided herein. Additional detailed description of the liquid evaporators 90, 90', and 90" may be found in U.S. Patent Application No. 61/614,601, which is incorporated by reference herein in its entirety.

In the exemplary arrangement of FIG. 5, the liquid evaporator 90 has a body defining a partially enclosed vessel 96 that floats or is otherwise maintained in a position in the reservoir 92 of wastewater such that the top surface of the wastewater is located between a top portion of the vessel disposed above the wastewater and a bottom portion of the vessel disposed in the wastewater. The vessel 96 defines an interior space 98 that is confined by the walls of the vessel. An opening 100 through a submerged portion of the vessel 96 allows wastewater to enter into the bottom portion of the interior space 98 confined within the vessel 96. The bottom portion of the interior space 98 is in fluid communication with the upper portion of the interior space 98 such that water vapor may travel from the bottom portion into the top portion. The top portion of the interior space 98 at least partly defines an exhaust path A from the top surface of the wastewater inside the vessel 96 to one or more exhaust ports 102 to the surrounding environment. The exhaust ports 102 are operatively located above the top surface of the wastewater. An air downcomer 104 is arranged to be connected to an air supply line, such as the conduit 95. The air downcomer 104 has a discharge outlet 106 disposed inside the bottom portion of the interior space 98. The discharge outlet 106 may include an open bottom end 106*a* of the air downcomer 104. The discharge outlet 106 includes a plurality of sparge ports 106*b* through the sidewall of the air downcomer 104 adjacent the open bottom end 106*a*. The area where the discharge outlet 106 is located inside the bottom portion of the confined space 98 forms an air entrainment chamber 108 during operation of the liquid evaporator. In operation, an air pump, such as the fan 93, forces air through the air downcomer 104 into the air entrainment chamber 108, where the air displaces wastewater causing wastewater to flow upwards into the bottom open end 100 of the air entrainment chamber 108 and through the interior space 98, thereby establishing vigorous mixing of the air with the wastewater. The air-water mixture then moves naturally to the top surface of the wastewater inside the confined interior space 98, where the air and water vapor separates from the wastewater, for example, by bubbling. From the top surface of the wastewater inside the interior space 98, the air and water vapor travels through the exhaust pathway A to be exhausted out of the vessel 96 through the exhaust ports 102 as moist exhaust air containing water vapor, while concentrated wastewater and contaminants are trapped within the vessel 96 and returned to the wastewater. In this manner, water is evaporated and separated out from the contaminants without allowing uncontrolled dispersion of the wastewater mist or spray into the surrounding environment. The liquid evaporator 90 may be maintained in the operative position at the top surface of the wastewater in the reservoir 92 by any convenient mechanism, such as support legs, a suspension structure, and/or flotation.

In one optional arrangement, the interior space 98 of the vessel 96 includes an upper chamber 110, a middle chamber 112, and a lower chamber 114, which are in fluid communication with each other. An open bottom end of the lower chamber 114 defines the opening 100. An open top end of the lower chamber 114 connects with an opening at the bottom of the middle chamber 112. In the operative position, the top level of the wastewater extends through the middle chamber 112, such that the lower chamber 114 and a lower portion of the middle chamber 112 are disposed in the wastewater, and the upper chamber 110 and the upper portion of the middle chamber 112 are disposed above the wastewater. The air entrainment chamber 108 is defined inside the lower chamber 114. Flotation devices 116 carried by the vessel 96 are located so as to maintain the liquid evaporator 90 in the operative position. The exhaust ports 102 are directed downwardly toward the top surface of the wastewater. The downcomer 104 extends down through the top of the vessel 96, into and through the upper chamber 110 and the middle chamber 112, and into the lower chamber 114. The discharge outlet 106 is spaced above the opening 100 a space sufficient to ensure that air discharged through the discharge outlet 106 does not exit through the opening 100 under normal operating conditions. A baffle 118 separates the upper chamber 110 from the middle chamber 112. Openings 120 through the baffle 118 allow water vapor to pass from the middle chamber 112 to the upper chamber 110. Demisting structures 122 are disposed in the upper chamber in and/or across the exhaust path A to form a tortuous path from the openings 120 to the exhaust ports 102. Liquid discharge tubes 124*a*, 124*b* extend down from the middle chamber 112 on opposite sides of the lower chamber 114. The liquid discharge tubes 124*a*, 124*b* merge into a single discharge riser 124*c* below the vessel 96. An air vent tube 124*d* is located at the top of the discharge riser 124*c* at the junction of the discharge pipes 124*a* and 124*b*. The air vent tube 124*d* is substantially smaller than the liquid discharge tubes 124*a*, 124*b* or discharge riser 124*c*. The discharge riser 124*c* extends downwardly toward the bottom of the reservoir 92. As air is pumped through the downcomer 104 into the lower chamber 114, the water circulates upwardly in the air entrainment chamber 108 to the middle chamber 112, moves radially outwardly in the middle chamber 112, and then travels from the middle downwardly into the liquid discharge tubes 124*a*, 124*b*. The water is discharged back into the reservoir 92 out of one or more openings in the discharge riser 124*c*. The liquid evaporator 90 is preferably fabricated almost entirely from plastics, such as polyvinyl chloride, polypropylene, or high density polyethylene.

In the exemplary arrangement of FIG. 6, the liquid evaporator 90' is adapted for use in a multi-stage system that uses the evaporator 90' as an intermediate in-line unit with a connection for transferring the exhaust water vapor to another processing step, such as another liquid evaporator 90, 90', or 90", or to a remote exhaust location. The liquid evaporator 90' is substantially similar to the liquid evaporator 90 with the exception that, in the upper chamber 110, the liquid evaporator 90' has only a single exhaust port 102 for connection to another transfer conduit instead of a plurality of exhaust ports 102, and the liquid evaporator 90' has a single bustle 130 instead of the baffles 122. The vessel 96, the downcomer 104, and the exhaust path A are preferably arranged radially symmetrically about a vertical axis Z, and the exhaust port 102 is non-symmetrically arranged about the vertical axis Z at a single location on one side of the top chamber 110. All other portions of the evaporator 90' are preferably the same as the corresponding portions on the evaporator 90 and will not be described again for the sake of brevity. The bustle 130 is arranged to allow the non-symmetrically located exhaust port 102 to draw off air and water vapor from inside the top chamber 110 so as to maintain radially symmetrical flow of air upwardly from the sparge ports 106*b* and through the lower and middle chambers 114 and 112, by for example, causing uniform radial mass flow of air at all circumferential locations around the bustle 130 from a region inside the bustle 130 radially outwardly to a region outside of the bustle 130 to the exhaust port 102. The bustle 130 is formed of a circumferential wall 132, preferably a cylindrical wall, extending upwardly from the baffle 118 part way to the top interior wall of the upper chamber 110. The circumferential wall 132 is spaced radially between the outer peripheral wall of the upper chamber 110 and the openings 120, thereby forming an inner volume encompassed by the bustle 130 and an outer peripheral volume between the bustle 130 and the outer peripheral wall. The circumferential wall 132 defines a gap 134 between the inner volume and the outer peripheral volume. The gap 134 has a width W between a top edge of the circumferential wall 132 and a top wall of the upper chamber 110. The width W of the gap 134 is continuously variable along the length of the wall 132. The gap 134 has a smallest width W (e.g., the wall 132 is tallest) immediately adjacent the location of the exhaust port 102. The gap 134 has a largest width W diametrically opposite the location of the exhaust port 102. In the present example, the circumferential wall 132 is cylindrical and the top edge defines an inclined plane with its highest point adjacent the exhaust port 102 and its lowest point diametrically opposite from the exhaust port 102. Preferably, the width W of the gap 134 is arranged to vary so the velocity of exhaust air is constant through any vertical cross-section of the gap 134 that is in a plane perpendicular to conduit 106 Other bustle designs capable of providing or improving uniform radial mass flow of the air outwardly from the inner volume are also possible, such as those disclosed in U.S. Pat. No. 7,442,035, which is incorporated by reference herein in its entirety. The exhaust port 102 is optionally connected to a conduit 136 that is operatively connected to another instrument, such as another evaporator 90, 90', or 90". The exhaust port 102 may alternatively exhaust to air or be connected to some other device.

In the exemplary arrangement of FIG. 7, the liquid evaporator 90" is substantially similar to the liquid evaporators 90 and/or 90', but with the addition of an adjustable stabilization system 140 and two additional discharge tubes 124e and 124f. Like the previously described liquid evaporators 90 and 90', the liquid evaporator 90" also includes the partially enclosed vessel 96 having the middle chamber 112 disposed between the upper chamber 110 and the lower chamber 114, the air supply downcomer 104 arranged for connection to an air supply line, such as the conduit 95, for injecting air into the air entrainment chamber 108 formed by the lower chamber 114, and internal baffles 122 and/or the bustle 130 (not visible) arranged in the upper chamber 110 to provide a tortuous path to one or more exhaust outlets 102. The discharge tubes 124a,b,e, f are preferably radially spaced equally from the axis Z and preferably spaced at 90° on center around the outer periphery. Further, the outer annular periphery of the lower chamber 114 is spaced radially inwardly from the discharge tubes 124a,b,e,f rather than being located immediately adjacent the discharge tubes as shown for the liquid evaporators 90 and 90'. Preferably, remaining features of the partially enclosed vessel 96 are identical to corresponding features in either of the liquid evaporators 90 or 90' and can be understood with reference to the prior descriptions thereof. The adjustable stabilization system 140 is arranged to help stabilize the liquid evaporator 90" in an upright operative position, i.e., with the axis Z aligned generally vertically, the lower chamber 114 disposed in the wastewater, and the upper chamber 110 disposed above the wastewater while air is being forced through the air supply downcomer 104 into the lower chamber 114. The stabilization system 140 includes flotation devices 142 operatively secured to the vessel 96 by outriggers 144. The position of the flotation devices 142 may be adjusted axially and/or radially to cause the vessel 96 to sit higher or lower in the wastewater. The flotation devices 142 are disposed diametrically opposite each other on opposite sides of the vessel 96. Each flotation device 142 preferably is spaced radially from the outer annular periphery of the vessel and sized to provide sufficient buoyancy to hold the upper chamber 110 spaced above the top surface of the wastewater. The outriggers 144 are formed by two struts arranged in parallel on opposite sides of the downcomer 104 and connected to the top of the vessel. Each strut extends outwardly from opposite sides of the outer annular periphery of the upper chamber 110, and each flotation device 142 is attached near the ends of the struts. One or more hinges 146 in the struts are spaced from the outer annular periphery of the upper chamber 110 and arranged to allow the flotation devices 142 to be selectively raised and/or lowered by pivoting the ends of the struts around the respective hinges. The flotation devices 142 are preferably disposed spaced along an axis of the conduit 95 over the top of the vessel 96 approaching the downcomer 104. The flotation devices 142 are arranged to counteract rotational forces that act to tip the vessel 96 away from substantially vertical alignment in response to air being forced through the conduit 95.

The systems, apparatuses, and methods for treating flue gas desulfurization purge water and other forms of wastewater disclosed herein may be useful to address water-use for thermoelectric generating units, particularly such units that rely on burning hydrocarbon fuels, such as coal. In some applications, the systems, apparatuses, and methods may be implemented as important components of or for zero-liquid discharge (ZLD) treatment systems, moisture recovery, wastewater treatment, landfill management, water management for carbon dioxide technologies, cooling tower and advanced cooling system technologies, and/or integrated water management and modeling in thermoelectric generating units. The systems, apparatuses, and methods may help an operator of a thermoelectric generating unit to increase water usage and/or re-usage efficiency, reduce water withdrawal and/or consumption, and/or meet water discharge limits. The technologies disclosed herein in some arrangements may provide a cost effective treatment alternative to currently known treatment processes for flue gas desulfurization purge water and other types of wastewater. The technologies disclosed herein may reduce power consumption and/or capture wastewater pollutants with a more efficient process for environmentally friendly disposal of discharge pollutants.

Additional modifications to the systems, apparatuses, and methods disclosed herein will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the appended claims are reserved.

We claim:

1. A wastewater treatment system for a thermoelectric power plant, the system comprising:
 a first wastewater concentrator operatively connected to a wastewater holding reservoir, the first wastewater concentrator implementing a contained air-water interface liquid evaporator, the air-water interface liquid evaporator including a body defining a partially enclosed vessel that is disposed at least partially within the wastewater holding reservoir, a top surface of the wastewater in the wastewater holding reservoir being located between a top portion of the vessel and a bottom portion of the vessel, the vessel defining an interior space that is confined by the walls of the vessel, the interior space including an upper chamber, a middle chamber, and a lower chamber that are in fluid communication with one another, and an opening through a submerged portion of the vessel, the opening allowing wastewater to enter into the bottom portion of the interior space of the vessel;
 a second wastewater concentrator operatively connected to the wastewater holding reservoir, the second wastewater concentrator implementing a direct contact adiabatic wastewater concentrator system, the second wastewater concentrator comprising a direct contact evaporative section and a gas-liquid separator, the direct contact evaporative section including a venturi section;

a stream of wastewater generated in a thermoelectric power plant operatively connected to the wastewater holding reservoir; and a stream of hot feed gases operatively connected to the second wastewater concentrator to supply feed gases to the direct contact evaporative section simultaneously as the stream of wastewater;

wherein an open bottom of the lower chamber defines the opening and in the operative position the top surface of the wastewater extends through the middle chamber, the lower chamber and a lower portion of the middle chamber being disposed beneath the top surface of the wastewater and the upper chamber and an upper portion of the middle chamber being disposed above the top surface of the wastewater, wherein the direct contact evaporative section mixes the hot feed gases directly with the wastewater and evaporates water from the wastewater to form water vapor and concentrated wastewater, and wherein the gas-liquid separator separates the water vapor from the concentrated wastewater and exhausts discharge gases from the gas-liquid separator, including the water vapor and some or all of the feed gases.

2. The wastewater treatment system of claim 1, wherein the stream of wastewater comprises at least one of flue gas desulfurization purge water, cooling tower purge water, service water, power plant leachate, and power plant holding reservoir water.

3. The wastewater treatment system of claim 2, wherein the stream of hot feed gases is heated with waste heat from within the thermoelectric power plant.

4. The wastewater treatment system of claim 3, wherein the hot feed gases comprise hot flue gases from a hydrocarbon-fired combustion heater.

5. The wastewater treatment system of claim 1 wherein the gas-liquid separator comprises at least one of a cross flow gas-liquid separator and a cyclonic gas-liquid separator operatively connected to the direct contact evaporative section.

6. A method of processing wastewater from a thermoelectric power plant with a first wastewater concentrator and a second wastewater concentrator, wherein the first wastewater concentrator includes a contained air-water interface liquid evaporator including a body defining a partially enclosed vessel that is disposed at least partially within a wastewater holding reservoir, a top surface of wastewater in the wastewater holding reservoir being located between a top portion of the vessel and a bottom portion of the vessel, the vessel defining an interior space that is confined by walls of the vessel, the interior space including an upper chamber, a middle chamber, and a lower chamber that are in fluid communication with one another, and an opening through a submerged portion of the vessel, the opening allowing wastewater to enter into the bottom portion of the interior space of the vessel; the second wastewater concentrator includes a direct contact adiabatic wastewater concentrator system having a venturi section; the power plant includes a source of wastewater and a source hot feed gases, the method comprising:

receiving wastewater though the opening into the bottom portion of the first wastewater concentrator;

evaporating a portion of the wastewater in the first wastewater concentrator, thereby separating the wastewater into a vapor portion and an unevaporated liquid portion;

receiving a stream of the hot feed gases into the second wastewater concentrator;

receiving feed wastewater including the unevaporated liquid portion into the second wastewater concentrator;

mixing the hot feed gases directly with the unevaporated liquid portion in the venturi section of the second wastewater concentrator to evaporate water vapor from the unevaporated liquid portion to form a concentrated wastewater;

separating the water vapor from the concentrated wastewater in the second wastewater concentrator to form a concentrated discharge brine and discharge gases; and exhausting the discharge gases from the second wastewater concentrator, wherein an open bottom of the lower chamber defines the opening and in the operative position the top surface of the wastewater extends through the middle chamber, the lower chamber and a lower portion of the middle chamber being disposed beneath the top surface of the wastewater and the upper chamber and an upper portion of the middle chamber being disposed above the top surface of the wastewater.

7. The method of claim 6, wherein the wastewater comprises at least one of flue gas desulfurization purge water, cooling tower purge water, and service water.

8. The method of claim 6, wherein the hot feed gases comprise hot flue gases discharged from a hydrocarbon-fired combustion heater.

9. The method of claim 6, further comprising the step of post-processing the discharge brine.

10. The method of claim 9, wherein the step of post-processing includes the steps of removing solids from liquids in the discharge brine in a solid-liquid separator and/or further concentration of the discharge brine.

11. The method of claim 6, further comprising the step of pre-processing the stream of hot feed gases to separate particulates from the hot feed gases prior to receiving the hot feed gases into the wastewater concentrator.

12. The method of claim 6, further comprising the steps:

reheating the discharge gases above the acid-gas condensation temperature of the discharge gases; and returning the discharge gases to an exhaust system of the thermoelectric power plant.

13. A thermoelectric power plant comprising:

a thermoelectric generator for producing electricity;

a first wastewater concentrator operatively connected to a wastewater holding reservoir, the first wastewater concentrator comprising a contained air-water interface liquid evaporator, the air-water interface liquid evaporator including a body defining a partially enclosed vessel that is disposed at least partially within the wastewater holding reservoir, a top surface of the wastewater in the wastewater holding reservoir being located between a top portion of the vessel and a bottom portion of the vessel, the vessel defining an interior space that is confined by the walls of the vessel, the interior space including an upper chamber, a middle chamber, and a lower chamber that are in fluid communication with one another, and an opening through a submerged portion of the vessel, the opening allowing wastewater to enter into the bottom portion of the interior space of the vessel;

a second wastewater concentrator operatively connected to the wastewater holding reservoir, the second wastewater concentrator comprising a direct contact adiabatic wastewater concentrator system including a venturi section;

a source of wastewater operatively connected to the wastewater holding reservoir to supply feed wastewater to the wastewater holding reservoir; and a source of hot feed gases operatively connected to the second wastewater concentrator to supply the hot feed gases to the second wastewater concentrator;

wherein an open bottom of the lower chamber defines the opening and in the operative position the top surface of the wastewater extends through the middle chamber, the lower chamber and a lower portion of the middle chamber being disposed beneath the top surface of the wastewater and the upper chamber and an upper portion of the middle chamber being disposed above the top surface of the wastewater, and wherein the second wastewater concentrator mixes the hot feed gases directly with the feed wastewater, evaporates water vapor from the feed wastewater, separates the water vapor from the feed wastewater thereby forming discharge brine and discharge gases, exhausts the discharge gases to atmosphere and/or another process component, and provides the discharge brine in a form suitable for further processing and/or disposal separate from the discharge gases.

14. The thermoelectric power plant of claim 13, wherein the thermoelectric generator comprises a boiler for generating steam to turn a turbine operatively connected to an electric generator, and wherein the source of wastewater comprises a flue gas desulfurization system operatively connected to the boiler to receive flue gas from the boiler, wherein the flue gas desulfurization system removes sulfur from the flue gas and generates flue gas desulfurization purge water containing contaminants, and wherein the wastewater concentrator is operatively connected to the flue gas desulfurization system to receive feed wastewater containing at least some of the desulfurization purge water.

15. The thermoelectric power plant of claim 14, wherein the boiler comprises a hydrocarbon-fired combustion heater.

16. The thermoelectric power plant of claim 14, wherein the source of hot feed gases comprises hot flue gases from the boiler.

17. The thermoelectric power plant of claim 13, wherein the source of wastewater comprises at least one of cooling tower purge water and service water.

18. The thermoelectric power plant of claim 13, wherein the thermoelectric generator comprises a gas turbine and the source of hot feed gases comprises waste heat generated by the gas turbine.

19. The wastewater treatment system of claim 1, wherein the upper chamber forms a tortuous exhaust path from the middle chamber to at least one exhaust port, the at last one exhaust port directing exhaust gases downward, toward the top surface of the wastewater.

* * * * *